United States Patent [19]

Suzuki et al.

[11] Patent Number: 4,974,067
[45] Date of Patent: Nov. 27, 1990

[54] MULTI-STEP-DIGITAL COLOR IMAGE REPRODUCING METHOD AND APPARATUS

[75] Inventors: Koichi Suzuki, Yokohama; Noboru Murayama, Tokyo, both of Japan

[73] Assignee: Ricoh Company, Ltd., Tokyo, Japan

[21] Appl. No.: 58,945

[22] Filed: Jun. 5, 1987

[30] Foreign Application Priority Data

| | | |
|---|---|---|
| Jun. 6, 1986 [JP] | Japan | 61-131265 |
| Jun. 12, 1986 [JP] | Japan | 61-136941 |
| Jun. 12, 1986 [JP] | Japan | 61-136942 |

[51] Int. Cl.$^5$ .................................................. H04N 1/46
[52] U.S. Cl. ........................................ 358/75; 358/458
[58] Field of Search ................ 358/75, 75 IJ, 283, 358/80, 458, 459

[56] References Cited

U.S. PATENT DOCUMENTS

| | | | |
|---|---|---|---|
| 3,922,484 | 11/1975 | Keller | 358/283 |
| 4,412,225 | 10/1983 | Yoshida et al. | 358/75 IJ |
| 4,486,788 | 12/1984 | Yamada | 358/283 |
| 4,593,297 | 6/1986 | Suzuki et al. | 358/283 |
| 4,595,948 | 6/1986 | Itoh et al. | 358/75 IJ |
| 4,668,978 | 5/1987 | Gokita | 358/75 |
| 4,680,625 | 7/1987 | Shoji et al. | 385/75 |
| 4,698,691 | 10/1987 | Suzuki et al. | 358/283 |
| 4,698,778 | 10/1987 | Ito et al. | 358/283 |
| 4,839,738 | 6/1989 | Kaku et al. | 358/426 |
| 4,860,114 | 8/1989 | Horikawa et al. | 358/426 |

FOREIGN PATENT DOCUMENTS

| | | | |
|---|---|---|---|
| 58-56572 | 4/1983 | Japan | 358/75 |
| 59-125173 | 7/1984 | Japan | 358/75 |
| 59-163959 | 9/1984 | Japan | 358/283 |
| 59-163977 | 9/1984 | Japan | 358/75 |
| 59-214382 | 12/1984 | Japan | 358/75 |
| 60-39981 | 3/1985 | Japan | 358/75 |
| 60-53373 | 3/1985 | Japan | 358/283 |
| 60-145769 | 8/1985 | Japan | 358/75 |
| 60-182864 | 9/1985 | Japan | 358/75 |
| 60-236367 | 11/1985 | Japan | 358/283 |

Primary Examiner—James J. Groody
Assistant Examiner—Mark R. Powell
Attorney, Agent, or Firm—Oblon, Spivak, McClelland, Maier & Neustadt

[57] ABSTRACT

A digital image processing method and an apparatus for the same which separate an original image into a plurality of color components to thereby produce image data each being associated with a respective one of the color components. The image data are individually processed to provide record color component density data. One halftone representation pattern is specified on a color component basis by the record color component density data to record that pattern. In color-by-color halftone data processing, there are used halftone representation patterns which are different in the positions of tone rendering spots from one color to another. Each of the record density data is extracted by assigning a particular area of the pattern thereto. The halftone representation patterns adapted to record a first and a second color which degrade color reproducibility when mixed together, e.g., those for magenta and cyan are provided with the centers of the above-mentioned spots at different positions from each other. The halftone representation patterns for recording a third color such as yellow have spots the centers of which are distributed between those of the patterns adapted for the first and second colors. The methodology and apparatus provide for the suppressing of overlapping of colors in a low density range despite the use of the same density pattern by changing the pattern phase, color by color and in addition implementing variable magnification recording of a high quality color image by use of a submatrix type recording system.

10 Claims, 32 Drawing Sheets

Fig. 1A

Y HALFTONE PATTERN

Fig. 1B

M HALFTONE PATTERN

Fig. 1C

C HALFTONE PATTERN

Fig. 1D

BK HALFTONE PATTERN

DENSITY 16, FULL-COLOR RECORDING

Y HALFTONE PATTERN

M HALFTONE PATTERN

C HALFTONE PATTERN

BK HALFTONE PATTERN

DENSITY 16, FULL-COLOR RECORDING

| 14 | 24 | 52 | 55 | 53 | 46 | 22 | 12 |
|---|---|---|---|---|---|---|---|
| 34 | 50 | 41 | 27 | 25 | 39 | 48 | 32 |
| 62 | 43 | 19 | 7 | 5 | 17 | 37 | 60 |
| 57 | 29 | 9 | 1 | 3 | 15 | 35 | 63 |
| 54 | 45 | 21 | 11 | 13 | 23 | 51 | 56 |
| 26 | 40 | 47 | 31 | 33 | 49 | 42 | 28 |
| 6 | 18 | 38 | 59 | 61 | 44 | 20 | 8 |
| 4 | 16 | 36 | 64 | 58 | 30 | 10 | 2 |

Y HALFTONE PATTERN
($X_0=0$, $Y_0=0$)

Fig. 6B

| 54 | 45 | 21 | 11 | 13 | 23 | 51 | 56 |
|---|---|---|---|---|---|---|---|
| 26 | 40 | 47 | 31 | 33 | 49 | 42 | 28 |
| 6 | 18 | 38 | 59 | 61 | 44 | 20 | 8 |
| 4 | 16 | 36 | 64 | 58 | 30 | 10 | 2 |
| 14 | 24 | 52 | 55 | 53 | 46 | 22 | 12 |
| 34 | 50 | 41 | 27 | 25 | 39 | 48 | 32 |
| 62 | 43 | 19 | 7 | 5 | 17 | 37 | 60 |
| 57 | 29 | 9 | 1 | 3 | 15 | 35 | 63 |

BK HALFTONE PATTERN
($X_0=0$, $Y_0=4$)

Fig. 6C

| 20 | 8 | 6 | 18 | 38 | 59 | 61 | 44 |
|---|---|---|---|---|---|---|---|
| 10 | 2 | 4 | 16 | 36 | 64 | 58 | 30 |
| 22 | 12 | 14 | 24 | 52 | 55 | 53 | 46 |
| 48 | 32 | 34 | 50 | 41 | 27 | 25 | 39 |
| 37 | 60 | 62 | 43 | 19 | 7 | 5 | 17 |
| 35 | 63 | 57 | 29 | 9 | 1 | 3 | 15 |
| 51 | 56 | 54 | 45 | 21 | 11 | 13 | 23 |
| 42 | 28 | 26 | 40 | 47 | 31 | 33 | 49 |

M HALFTONE PATTERN
($X_0=2$, $Y_0=2$)

Fig. 6D

| 38 | 59 | 61 | 44 | 20 | 8 | 6 | 18 |
|---|---|---|---|---|---|---|---|
| 36 | 64 | 58 | 30 | 10 | 2 | 4 | 16 |
| 52 | 55 | 53 | 46 | 22 | 12 | 14 | 24 |
| 41 | 27 | 25 | 39 | 48 | 32 | 34 | 50 |
| 19 | 7 | 5 | 17 | 37 | 60 | 62 | 43 |
| 9 | 1 | 3 | 15 | 35 | 63 | 57 | 29 |
| 21 | 11 | 13 | 23 | 51 | 56 | 54 | 45 |
| 47 | 31 | 33 | 49 | 42 | 28 | 26 | 40 |

C HALFTONE PATTERN
($X_0=6$, $Y_0=2$)

| y | m | m | BK | BK | c | c | y |
|---|---|---|----|----|---|---|---|
| m | m | m | m | c | c | c | c |
| BK | m | m | y | y | c | c | BK |
| BK | BK | Y | Y | Y | Y | BK | BK |
| BK | c | c | y | y | m | m | BK |
| c | c | c | c | m | m | m | m |
| y | c | c | BK | BK | m | m | y |
| y | y | Bk | Bk | Bk | Bk | y | y |

DENSITY 16, FULL COLOR
RECORDING

FIG. 6E

| c | y | y | c | c | y | y | c |
|---|---|---|---|---|---|---|---|
| c | y | y | c | c | y | y | c |
| BK | m | m | BK | BK | m | m | BK |
| BK | m | m | BK | BK | m | m | BK |
| c | y | y | c | c | y | y | c |
| c | y | y | c | c | y | y | c |
| BK | m | m | BK | BK | m | m | BK |
| BK | m | m | BK | BK | m | m | BK |

DENSITY 16, FULL COLOR
RECORDING

| 37 | 13 | 9 | 41 | 39 | 15 | 11 | 43 |
|----|----|---|----|----|----|----|----|
| 17 | 1  | 5 | 29 | 19 | 3  | 7  | 31 |
| 53 | 21 | 25| 49 | 55 | 23 | 27 | 51 |
| 57 | 33 | 45| 61 | 59 | 35 | 47 | 63 |
| 40 | 16 | 12| 44 | 38 | 14 | 10 | 42 |
| 20 | 4  | 8 | 32 | 18 | 2  | 6  | 30 |
| 56 | 24 | 28| 52 | 54 | 22 | 26 | 50 |
| 60 | 36 | 48| 64 | 58 | 34 | 46 | 62 |

Y HALFTONE PATTERN
($X_0 = 0$, $Y_0 = 0$)

Fig. 7B

| 26 | 50 | 56 | 24 | 28 | 52 | 54 | 22 |
|----|----|----|----|----|----|----|----|
| 46 | 62 | 60 | 36 | 48 | 64 | 58 | 34 |
| 11 | 43 | 37 | 13 | 9  | 41 | 39 | 15 |
| 7  | 31 | 17 | 1  | 5  | 29 | 19 | 3  |
| 27 | 51 | 53 | 21 | 25 | 49 | 55 | 23 |
| 47 | 63 | 57 | 33 | 45 | 61 | 59 | 35 |
| 10 | 42 | 40 | 16 | 12 | 44 | 38 | 14 |
| 6  | 30 | 20 | 4  | 8  | 32 | 18 | 2  |

BK HALFTONE PATTERN
($X_0 = 2$, $Y_0 = 2$)

Fig. 7C

| 56 | 24 | 28 | 52 | 54 | 22 | 26 | 50 |
|----|----|----|----|----|----|----|----|
| 60 | 36 | 48 | 64 | 58 | 34 | 46 | 62 |
| 37 | 13 | 9  | 41 | 39 | 15 | 11 | 43 |
| 17 | 1  | 5  | 29 | 19 | 3  | 7  | 31 |
| 53 | 21 | 25 | 49 | 55 | 23 | 27 | 51 |
| 57 | 33 | 45 | 61 | 59 | 35 | 47 | 63 |
| 40 | 16 | 12 | 44 | 38 | 14 | 10 | 42 |
| 20 | 4  | 8  | 32 | 18 | 2  | 6  | 30 |

M HALFTONE PATTERN
($X_0 = 0$, $Y_0 = 2$)

Fig. 7D

| 11 | 43 | 37 | 13 | 9  | 41 | 39 | 15 |
|----|----|----|----|----|----|----|----|
| 7  | 31 | 17 | 1  | 5  | 29 | 19 | 3  |
| 27 | 51 | 53 | 21 | 25 | 49 | 55 | 23 |
| 47 | 63 | 57 | 33 | 45 | 61 | 59 | 35 |
| 10 | 42 | 40 | 16 | 12 | 44 | 38 | 14 |
| 6  | 30 | 20 | 4  | 8  | 32 | 18 | 2  |
| 26 | 50 | 56 | 24 | 28 | 52 | 54 | 22 |
| 46 | 62 | 60 | 36 | 48 | 64 | 58 | 34 |

C HALFTONE PATTERN
($X_0 = 2$, $Y_0 = 0$)

Fig. 8A

| 54 | 25 | 17 | 48 | 56 | 27 | 19 | 46 |
|----|----|----|----|----|----|----|----|
| 33 | 1  | 9  | 57 | 35 | 3  | 11 | 59 |
| 23 | 41 | 49 | 29 | 21 | 43 | 51 | 31 |
| 15 | 63 | 37 | 5  | 13 | 61 | 39 | 7  |
| 55 | 28 | 20 | 45 | 53 | 26 | 18 | 47 |
| 36 | 4  | 12 | 60 | 34 | 2  | 10 | 58 |
| 22 | 44 | 52 | 32 | 24 | 42 | 50 | 30 |
| 14 | 62 | 40 | 8  | 16 | 64 | 38 | 6  |

Y HALFTONE PATTERN
($X_0 = 0, Y_0 = 0$)

Fig. 8B

| 5  | 13 | 61 | 39 | 7  | 15 | 63 | 37 |
|----|----|----|----|----|----|----|----|
| 45 | 53 | 26 | 18 | 47 | 55 | 28 | 20 |
| 60 | 34 | 2  | 10 | 58 | 36 | 4  | 12 |
| 32 | 24 | 42 | 50 | 30 | 22 | 44 | 52 |
| 8  | 16 | 64 | 38 | 6  | 14 | 62 | 40 |
| 48 | 56 | 27 | 19 | 46 | 54 | 25 | 17 |
| 57 | 35 | 3  | 11 | 59 | 33 | 1  | 9  |
| 29 | 21 | 43 | 51 | 31 | 23 | 41 | 49 |

BK HALFTONE PATTERN
($X_0 = 5, Y_0 = 5$)

Fig. 8C

| 63 | 37 | 5  | 13 | 61 | 39 | 7  | 15 |
|----|----|----|----|----|----|----|----|
| 28 | 20 | 45 | 53 | 26 | 18 | 47 | 55 |
| 4  | 12 | 60 | 34 | 2  | 10 | 58 | 36 |
| 44 | 52 | 32 | 24 | 42 | 50 | 30 | 22 |
| 62 | 40 | 8  | 16 | 64 | 38 | 6  | 14 |
| 25 | 17 | 48 | 56 | 27 | 19 | 46 | 54 |
| 1  | 9  | 57 | 35 | 3  | 11 | 59 | 33 |
| 41 | 49 | 29 | 21 | 43 | 51 | 31 | 23 |

M HALFTONE PATTERN
($X_0 = 7, Y_0 = 5$)

Fig. 8D

| 17 | 48 | 56 | 27 | 19 | 46 | 54 | 25 |
|----|----|----|----|----|----|----|----|
| 9  | 57 | 35 | 3  | 11 | 59 | 33 | 1  |
| 49 | 29 | 21 | 43 | 51 | 31 | 23 | 41 |
| 37 | 5  | 13 | 61 | 39 | 7  | 15 | 63 |
| 20 | 45 | 53 | 26 | 18 | 47 | 55 | 28 |
| 12 | 60 | 34 | 2  | 10 | 58 | 36 | 4  |
| 52 | 32 | 24 | 42 | 50 | 30 | 22 | 44 |
| 40 | 8  | 16 | 64 | 38 | 6  | 14 | 62 |

C HALFTONE PATTERN
($X_0 = 6, Y_0 = 0$)

| BK | BK | m  | m  | BK | BK | m  | m  |
|----|----|----|----|----|----|----|----|
| c  | y  | y  | c  | c  | y  | y  | c  |
| m  | m  | BK | BK | m  | m  | BK | BK |
| y  | c  | c  | y  | y  | c  | c  | y  |
| BK | BK | m  | m  | BK | BK | m  | m  |
| c  | y  | y  | c  | c  | y  | y  | c  |
| m  | m  | BK | BK | m  | m  | BK | BK |
| y  | c  | c  | y  | y  | c  | c  | y  |

DENSITY 16, FULL COLOR
RECORDING

| 26 | 50 | 56 | 24 | 28 | 52 | 54 | 22 |
|---|---|---|---|---|---|---|---|
| 46 | 62 | 60 | 36 | 48 | 64 | 58 | 34 |
| 11 | 43 | 37 | 13 | 9 | 41 | 39 | 15 |
| 7 | 31 | 17 | 1 | 5 | 29 | 19 | 3 |
| 27 | 51 | 53 | 21 | 25 | 49 | 55 | 23 |
| 47 | 63 | 57 | 33 | 45 | 61 | 59 | 35 |
| 10 | 42 | 40 | 16 | 12 | 44 | 38 | 14 |
| 6 | 30 | 20 | 4 | 8 | 32 | 18 | 2 |

Y HALFTONE PATTERN
($X_0 = 2$, $Y_0 = 2$)

Fig. 9B

| 9 | 57 | 35 | 3 | 11 | 59 | 33 | 1 |
|---|---|---|---|---|---|---|---|
| 17 | 48 | 56 | 27 | 19 | 46 | 54 | 25 |
| 49 | 29 | 21 | 43 | 51 | 31 | 23 | 41 |
| 37 | 5 | 13 | 61 | 39 | 7 | 15 | 63 |
| 20 | 45 | 53 | 26 | 18 | 47 | 55 | 28 |
| 12 | 60 | 34 | 2 | 10 | 58 | 36 | 4 |
| 52 | 32 | 24 | 42 | 50 | 30 | 22 | 44 |
| 40 | 8 | 16 | 64 | 38 | 6 | 14 | 62 |

BK HALFTONE PATTERN
($X_0 = 6$, $Y_0 = 0$)
[1ST & 2ND ROWS REPLACED WITH EACH OTHER]

Fig. 9C

| 20 | 8 | 6 | 18 | 38 | 59 | 61 | 44 |
|---|---|---|---|---|---|---|---|
| 10 | 2 | 4 | 16 | 36 | 64 | 58 | 30 |
| 22 | 12 | 14 | 24 | 52 | 55 | 53 | 46 |
| 48 | 32 | 34 | 50 | 41 | 27 | 25 | 39 |
| 37 | 60 | 62 | 43 | 19 | 7 | 5 | 17 |
| 35 | 63 | 57 | 29 | 9 | 1 | 3 | 15 |
| 51 | 56 | 54 | 45 | 21 | 11 | 13 | 23 |
| 42 | 28 | 26 | 40 | 47 | 31 | 33 | 49 |

M HALFTONE PATTERN
($X_0 = 6$, $Y_0 = 6$)

Fig. 9D

| 38 | 59 | 61 | 44 | 20 | 8 | 6 | 18 |
|---|---|---|---|---|---|---|---|
| 36 | 64 | 58 | 30 | 10 | 2 | 4 | 16 |
| 52 | 55 | 53 | 46 | 22 | 12 | 14 | 24 |
| 41 | 27 | 25 | 39 | 48 | 32 | 34 | 50 |
| 19 | 7 | 5 | 17 | 37 | 60 | 62 | 43 |
| 9 | 1 | 3 | 15 | 35 | 63 | 57 | 29 |
| 21 | 11 | 13 | 23 | 51 | 56 | 54 | 45 |
| 47 | 31 | 33 | 49 | 42 | 28 | 26 | 40 |

C HALFTONE PATTERN
($X_0 = 2$, $Y_0 = 6$)

Fig. 9E

DENSITY 16, FULL-COLOR RECORDING

| 20 | 8 | 6 | 18 | 38 | 59 | 61 | 44 |
|----|---|---|----|----|----|----|----|
| 10 | 2 | 4 | 16 | 36 | 64 | 58 | 30 |
| 22 | 12 | 14 | 24 | 52 | 55 | 53 | 46 |
| 48 | 32 | 34 | 50 | 41 | 27 | 25 | 39 |
| 37 | 60 | 62 | 43 | 19 | 7 | 5 | 17 |
| 35 | 63 | 57 | 29 | 9 | 1 | 3 | 15 |
| 51 | 56 | 54 | 45 | 21 | 11 | 13 | 23 |
| 42 | 28 | 26 | 40 | 47 | 31 | 33 | 49 |

M HALFTONE PATTERN
($X_0 = 2$, $Y_0 = 2$)

Fig. 11B

| 38 | 59 | 61 | 44 | 20 | 8 | 6 | 18 |
|----|----|----|----|----|---|---|----|
| 36 | 64 | 58 | 30 | 10 | 2 | 4 | 16 |
| 52 | 55 | 53 | 46 | 22 | 12 | 14 | 24 |
| 41 | 27 | 25 | 39 | 48 | 32 | 34 | 50 |
| 19 | 7 | 5 | 17 | 37 | 60 | 62 | 43 |
| 9 | 1 | 3 | 15 | 35 | 63 | 57 | 29 |
| 21 | 11 | 13 | 23 | 51 | 56 | 54 | 45 |
| 47 | 31 | 33 | 49 | 42 | 28 | 26 | 40 |

C HALFTONE PATTERN
($X_0 = 6$, $Y_0 = 2$)

Fig. 11C

| 26 | 50 | 56 | 24 | 28 | 52 | 54 | 22 |
|----|----|----|----|----|----|----|----|
| 46 | 62 | 60 | 36 | 48 | 64 | 58 | 34 |
| 11 | 43 | 37 | 13 | 9 | 41 | 39 | 15 |
| 7 | 31 | 17 | 1 | 5 | 29 | 19 | 3 |
| 27 | 51 | 53 | 21 | 25 | 49 | 55 | 23 |
| 47 | 63 | 57 | 33 | 45 | 61 | 59 | 35 |
| 10 | 42 | 40 | 16 | 12 | 44 | 38 | 14 |
| 6 | 30 | 20 | 4 | 8 | 32 | 18 | 2 |

Y HALFTONE PATTERN
($X_0 = 2$, $Y_0 = 2$)

Fig. 11D

| | M | M | | | C | C | |
|---|---|---|---|---|---|---|---|
| M | M | M | M | C | C | C | C |
| Y | M | M | Y | Y | C | C | Y |
| Y | | | Y | Y | | | Y |
| | C | C | | | M | M | |
| C | C | C | C | M | M | M | M |
| Y | C | C | Y | Y | M | M | Y |
| Y | | | Y | Y | | | Y |

Fig. 12A

M HALFTONE PATTERN

Fig. 12B

C HALFTONE PATTERN

Fig. 12C

Y HALFTONE PATTERN

Fig. 13A

M HALFTONE PATTERN

Fig. 13B

C HALFTONE PATTERN

Fig. 13C

Y HALFTONE PATTERN

Fig. 13D

| Fig.15 | Fig.15B | Fig.15D |
|---|---|---|
| | Fig.15A | Fig.15C |

Fig. 18A
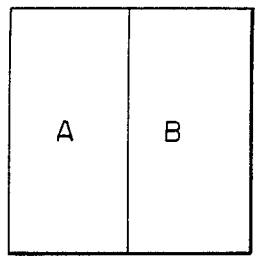
DIVIDED INTO TWO IN MAIN SCANNING DIRECTION
Fig. 18B
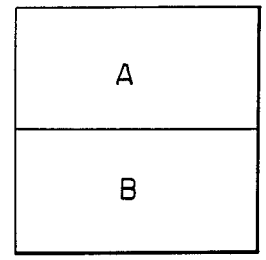
DIVIDED INTO TWO IN SUBSCANNING DIRECTION
Fig. 18C
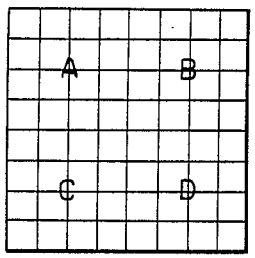
DIVIDED INTO FOUR
Fig. 18D
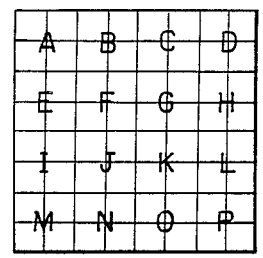
DIVIDED INTO SIXTEEN
Fig. 18E
| A | B | C | D | E | F | G | H |
|---|---|---|---|---|---|---|---|
| I | J | K | L | M | N | - | - |
| - | - | - | - | - | - |   |   |
|   |   |   |   |   |   |   |   |
|   |   |   |   |   |   |   |   |
|   |   |   |   |   |   |   |   |
|   |   |   |   |   |   |   |   |
|   |   |   |   |   |   |   |   |
DIVIDED INTO SIXTY-FOUR BIT BASIS

Fig. 20A

M = DIVIDED INTO FOUR

| 12 | 14 | 16 | 18 | 19 |
|----|----|----|----|----|
| 17 | 19 | 21 | 20 |    |
| 22 | 24 | 21 |    |    |
| 27 | 22 |    |    |    |

Fig. 20B

M = DIVIDED INTO SIXTEEN

| 12 | 14 | 16 | 18 | 19 |
|----|----|----|----|----|
| 17 | 19 | 21 | 20 | 24 |
| 22 | 24 | 21 | 25 | 26 |
| 27 | 22 | 26 | 27 |    |
| 23 | 27 |    |    |    |

Fig. 21A

M = DIVIDED INTO FOUR

| A OF 12 | B OF 14 | A OF 16 | B OF 18 | A OF 19 |
|---------|---------|---------|---------|---------|
| C OF 17 | D OF 19 | C OF 21 | D OF 20 |         |
| A OF 22 | B OF 24 | A OF 21 |         |         |
| C OF 22 | D OF 22 |         |         |         |

ONE DOT

AREA TO BE RECORDED WITH ONE TONE DATA

Fig. 21B

M = DIVIDED INTO SIXTEEN

| A OF 12 | B OF 14 | C OF 16 | D OF 18 | A OF 19 | | | |
|---|---|---|---|---|---|---|---|
| E OF 17 | F OF 19 | G OF 21 | H OF 20 | E OF 24 | | | |
| I OF 22 | J OF 24 | K OF 21 | L OF 25 | I OF 26 | | | |
| M OF 27 | N OF 22 | O OF 26 | P OF 27 | | | | |
| A OF 23 | B OF 27 | ▨ | | | | | |
| AREA TO BE RECORDED WITH ONE TONE DATA | | | | | | | |
| | | | | | | | |
| ONE DOT ▨ | | | | | | | |
| | | | | | | | |

MULTI-STEP-DIGITAL COLOR IMAGE REPRODUCING METHOD AND APPARATUS

BACKGROUND OF THE INVENTION

The present invention relates to processing for the reproduction of a color image and, more particularly, to digital color image reproduction processing for recording halftone which separates an original image into different color components to produce image data, or density data, of the individual color components, converts the image data into record color component density data, specifies on a color component basis a particular halftone representation pattern based on the record color component density data, and records that pattern.

In one of halftone image recording systems known in the art, halftone is recorded on the basis of digital image data, or density data, having tones which range from 0 (zero) to M.N. Specifically, digital image data are individually compared with $M \times N$ threshold values which are distributed in an $M \times N$ matrix either regularly or randomly. When any of the digital image data is greater than its associated threshold value, a record data bit is assigned to the position of that threshold value in the matrix; when the former is smaller than the latter, a non-record data bit is assigned. More than one dot is assigned to each bit of the resultant record and non-record bit matrix which corresponds to the threshold matrix. In another prior art recording system of the kind described, a threshold matrix and image data which are representative of 1 to M.N are compared to produce beforehand M.N record and non-record data bit matrices each corresponding to a respective one of those conditions wherein the image data is 1 to M.N, the matrices being stored in a memory. In the event of image reading and recording, one of such matrices is specified by image data read, so that data is recorded based on that specified bit matrix. Monocolor recording requires only one threshold matrix or M.N record and non-record data matrix. In the case of color recording, e.g., color recording using yellow (Y), magenta (M) and cyan (C), Y image record data, M image record data and C image record data are produced by color separation and signal processing, the above-stated halftone recording being effected with each of the three-color image record data.

However, when halftone recording in a plurality of colors is implemented with the same threshold matrix or the same set of record and non-record data bit matrices, moire and others appear in a reproduced color image to degrade image quality and, moreover, all of the colors are superposed at the same point to lower the distinctness of the colors.

One approach known in the art to eliminate moire and others consists in rotating the threshold matrix or the record and non-record data bit matrices by each predetermined angle to provide modified matrices for each of the colors, the modified matrices being different in screen angle color by color.

Nevertheless, various problems have heretofore been left unsolved. Specifically, the distinctness of colors cannot be improved to a satisfactory degree because even in a low density recording area the different colors are recorded in a superposed relation at the same point. The number of tones available is limited so that sufficient representation of halftone cannot be provided in a reproduced image. While the representation of halftone may be promoted by increasing the value of $M \times N$, such undesirably increases the recording area to be assigned to each of image data (data representative of the desity of the entire predetermined small area of a reproduced image), resulting in the enlargement of a reproduced image relative to an original image. In order to avoid such enlargement, it is necessary to increase the small area which should be read as one image data, but such leads to rough image reading and, therefore, to unfaithful image reproduction. Consequently, even if a wide range of tones are set up, the quality of image reproduction cannot be improved unless the area of each record dot is reduced. For the above reasons, it has been impracticable to increase the size of each halftone representation pattern, whether it be a threshold matrix or a record and non-record data bit matrix, beyond a certain limit.

Further, it has been customary to rotate the same halftone representation pattern, i.e., an orthogonal threshold matrix or an orthogonal record and non-record data bit matrix by a predetermined angle. This limits the freedom available in setting the screen angle and, thereby, prevents halftone representation patterns capable of enhancing the distinctness of colors from being achieved. The freedom mentioned is further limited because, as previously stated, each halftone representation pattern is relatively small.

SUMMARY OF THE INVENTION

It is therefore an object of the present invention to enhance the distinctness of colors in a reproduced color image.

It is another object of the present invention to implement a relatively wide range tone representation without resorting to any noticeable increase in the size of the small area which is assigned to one pixel data, while promoting the freedom of selection of minute areas where any color is to be recorded.

In order to achieve the above objects, in a digital processing method for production of a color image having the steps of separating a color image into a plurality of color components, converting image density into digital data on a color component basis, and processing the digital data to produce color component record density data; specifying on a color basis and based on the color component record density data one of a plurality of halftone representation patterns each having a predetermined number of bits and in each of which record data bits and non-record data bits each corresponding to a respective one of record densities, which are to be represented as a certain entire surface, are distributed; setting up on a color basis correspondence between bit data of the specified halftone representation pattern and a predetermined small area of a recording medium, and recording a predetermined color in a minute subarea of said small area to which, among the bit data which correspond to the small area, a record data bit is to be assigned; a group of a plurality of halftone representation patterns are assigned to each of the color components. Each of the halftone representation patterns in the same group has a record data bit distribution which is such that, when the halftone representation pattern is provided in a two-dimensional, or X-Y, bit distribution, record data bits sequentially expand from a predetermined point of X-Y coordinates as record density increases. The predetermined point of X-Y coordinates differs from one group to another. One of the halftone representation patterns, which correspond to any of the color components, is specified based on color component record data of the color component, at least a part of the halftone representation pattern specified is extracted, and the color component is recorded by assigning the extracted part of the halftone representation pattern to a predetermined small area of a recording medium which is assigned to the color component record density data.

The above and other objects, features and advantages of the present invention will become more apparent from the following detailed description taken with the accompanying drawings.

BRIEF DESCRIPTION OF THE DRAWINGS

FIG. 1A shows a distribution pattern of original data used for producing halftone representation patterns which are adapted to process yellow (Y) record data in accordance with one embodiment of the present invention;

FIG. 1B shows a distribution pattern of original data used for producing halftone representation patterns which are adapted to process magenta (M) record data;

FIG. 1C shows a distribution pattern of original data used for producing halftone representation patterns which are adapted to process cyan (C) record data;

FIG. 1D shows a distribution pattern of original data used for producing halftone representation patterns which are adapted to process black (BK) record data;

FIGS. 5A, 5B and 5C shows exemplary basic patterns of halftone representation patterns in accordance with another embodiment of the present invention;

FIGS. 6A, 6B, 6C and 6D show halftone representation patterns derived from the basic pattern of FIG. 5A and assigned one to each of record colors;

FIG. 6E shows a distribution of colors recorded on a surface based on those patterns and when the record density of the respective colors is 16;

FIGS. 7A, 7B, 7C, 7D show halftone representation patterns derived from the basic pattern of FIG. 5B and assigned one to each of record colors;

FIG. 7E shows a distribution of colors recorded on a surface based on those patterns and when the record density of the respective colors is 16;

FIGS. 8A, 8B, 8C and 8D show halftone representation patterns derived from the basic pattern of FIG. 5C and assigned one to each of the record colors;

FIG. 8E shows a distribution of colors recorded on a surface based on those patterns and when the record density of the respective colors is 16;

FIGS. 9A, 9B, 9C and 9D show, respectively, a halftone representation pattern produced on the basis of the basic pattern as shown in FIG. 5B, a halftone representation pattern produced by slightly modifying the basic pattern of FIG. 5C, a halftone representation pattern produced on the basis of the basic pattern as shown in FIG. 5A, and a halftone representation pattern also based on the basic pattern of FIG. 5A;

FIG. 9E shows a distribution of colors recorded on a surface based on those patterns and when the record density of the respective colors is 16;

FIGS. 10A, 10B, 10C and 10D show basic patterns of halftone representation patterns in accordance with another embodiment of the present invention;

FIGS. 11A, 11B and 11C show halftone representation patterns derived from the basic patterns of FIGS. 10B and 10C and assigned one to each of record colors;

FIG. 11D shows a distribution of colors recorded on a surface based on those patterns and when the record density of the respective colors is 16;

FIGS. 12a through 12c show examples of halftone representation patterns which are assigned, one to each of the recorded colors;

FIGS. 13A, 13B and 13C show still other examples of halftone representation patterns which are assigned one to each of record colors;

FIG. 13D shows a distribution of colors recorded on a surface on the basis of those patterns and when the record density of the respective colors is 20;

FIGS. 18A, 18B, 18C, 18D and 18E show some different manners of dividing a halftone representation pattern into child patterns (fragments) A, B, C and so on;

FIGS. 19A-1, 19A-Z, and 19B are flowcharts demonstrating a record image data processing operation of a microprocessor as shown in FIG. 16;

FIGS. 20A and 20B each shows a distribution of record density data which corresponds to a recording surface;

FIGS. 21A and 21B show, respectively, a record data distribution corresponding to the record density data distribution of FIG. 20A and provided by extracting record data from a halftone representation pattern based on the division of FIG. 18C, and a record data distribution corresponding to the record density data distribution of FIG. 20B and provided by extracting record data from a halftone representation pattern based on the division of FIG. 18D;

DESCRIPTION OF THE PREFERRED EMBODIMENTS

Various embodiments of the present invention will hereinafter be described in detail.

Figure 2:
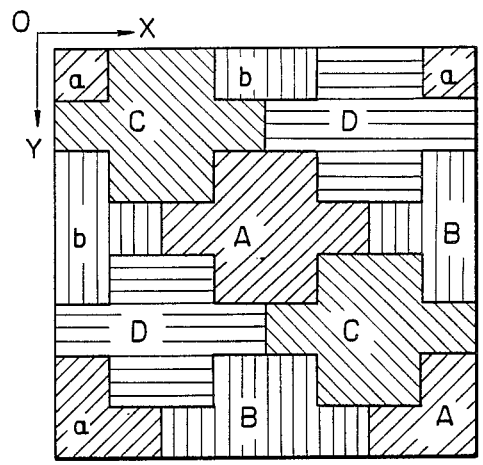
FIG. 2 shows a distribution of recorded areas provided when the record density of each color is 16.

FIGS. 1A to 1D are views representative of one embodiment of the present invention and each showing a particular distribution pattern of original data adapted to prepare a halftone representation pattern for processing a respective one of four different colors of record data as previously stated, i.e., yellow (Y) record data, magenta (M) record data, cyan (C) record data, and black (BK) record data. FIG. 2 shows a distribution of areas in which the respective colors mentioned above are recorded each with a record density of 16. Specifically, in FIG. 2, A and a indicate those areas which are recorded on the basis of the halftone representation pattern of FIGS. 1A, B and b indicate those areas which are recorded on the basis of the halftone representation pattern of FIGS. 1B, C and c indicate those areas which are recorded on the basis of the halftone representation pattern of FIGS. 1C, and D and d indicate those areas which are recorded on the basis of the halftone representation pattern of FIG. 1D.

In detail, the halftone representation patterns (threshold matrices) shown in FIGS. 1A to 1D are assigned to, for example, Y recording, magenta M recording, cyan C recording, and black BK recording, respectively. In the figures, one dot is assigned to each of hatched squares when the record density data is (decimal) 32. In this particular embodiment, the pattern shown in FIG. 1A is used as a basic pattern and provided with the centers of minute tone rendering spots (hereinafter simply referred to as spots) at the center and the corners of its 8×8 matrix pattern. The pattern of FIG. 1B is produced by shifting the basic pattern by four dots, or squares, in the vertical direction only, the pattern of FIG. 1C by shifting the basic pattern by two dots in each of the horizontal and vertical directions, and the pattern of FIG. 1D by shifting the pattern of FIG. 1C by four dots in the vertical direction.

When the four different colors Y, M, C and BK are recorded each in the density of 16 based on the four different kinds of halftone representation patterns which form spots of the same shape as described above, all of the four colors are recorded in the 8×8 matrix by the same number (sixteen) of dots and, yet, without overlapping each other, as shown in FIG. 2. Hence, so long as the record density does not increase beyond 16, the record colors do not overlap at all and, therefore, the distinctness of colors is considerably high. As the record density sequentially increases beyond 16, the number of dots of different colors which overlap each other is sequentially increased to lower the distinctness.

Figure 3A:
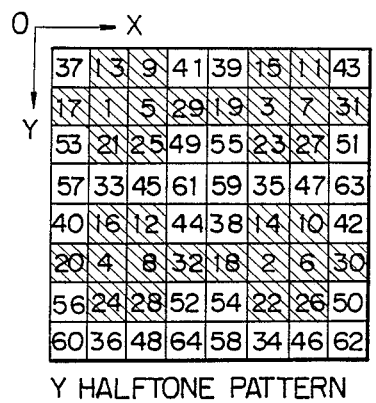
FIGS. 3A shows a distribution pattern of original data used for producing halftone representation patterns which are adapted to process Y record data in accordance with another embodiment of the present invention.
Figure 3B:
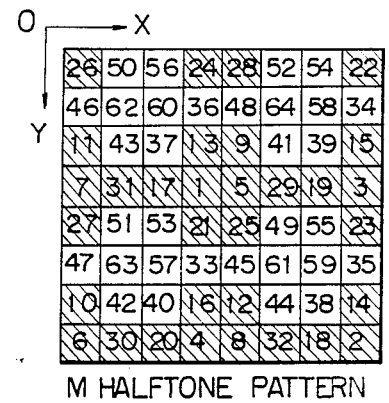
FIG. 3B shows a distribution pattern of original data used for producing halftone representation patterns which are adapted to process M record data.
Figure 3C:
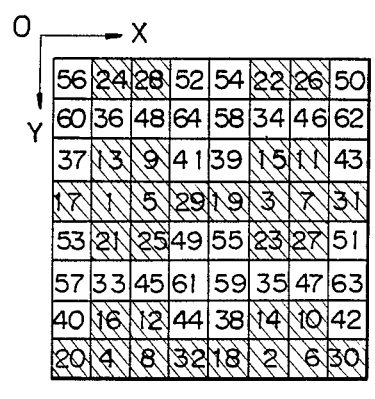
FIG. 3C shows a distribution pattern of original data used for producing halftone representation patterns which area adapted to process C record data.
Figure 3D:
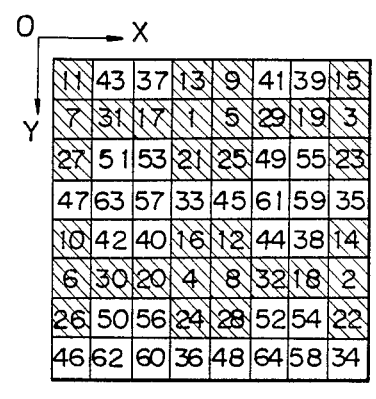
FIG. 3D shows a distribution pattern of original data used for producing halftone representation patterns which are adapted to process BK record data.

FIGS. 3A to 3D show another example of spot arrangement in which the halftone representation pattern comprises an 8×8 matrix as in the first example. Specifically, FIG. 3A shows a halftone representation pattern applicable to Y recording and serves as a basic pattern in this example. The pattern shown in FIG. 3B is applicable to M recording and produced by shifting the basic pattern two dots in each of the vertical and horizontal directions. The pattern of FIG. 3C is applicable to C recording and produced by shifting the basic pattern two dots in the vertical direction only. The pattern of FIG. 3D is applicable to BK recording and produced by shifting the basic pattern two dots in the horizontal direction only.

Figure 4:
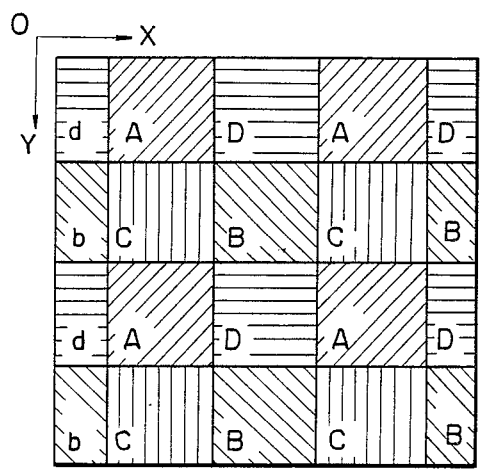
FIG. 4 shows a distribution of recorded areas provided when the record density of each color is 16.

In the example shown in FIGS. 3A to 3D, too, when the four different colors are recorded each in the density of 16, all of the four colors are recorded by the same number number (sixteen) dots in the 8×8 matrix without overlapping each other, as shown in FIG. 4. Hence, so long as the record density does not increase beyond 16, the colors recorded are prevented from overlapping each other to offer a considerable degree of distinctness. As the record density commanded sequentially increases beyond 16, the number of dots of different colors which overlap each other is sequentially increased to lower the distinctness.

Another embodiment of the present invention will be described with reference to FIGS. 5A to 5C, 6A to 6C, 7A to 7E, 8A to 8E, and 9A to 9B.

Figures 5A, 5B, 5C:
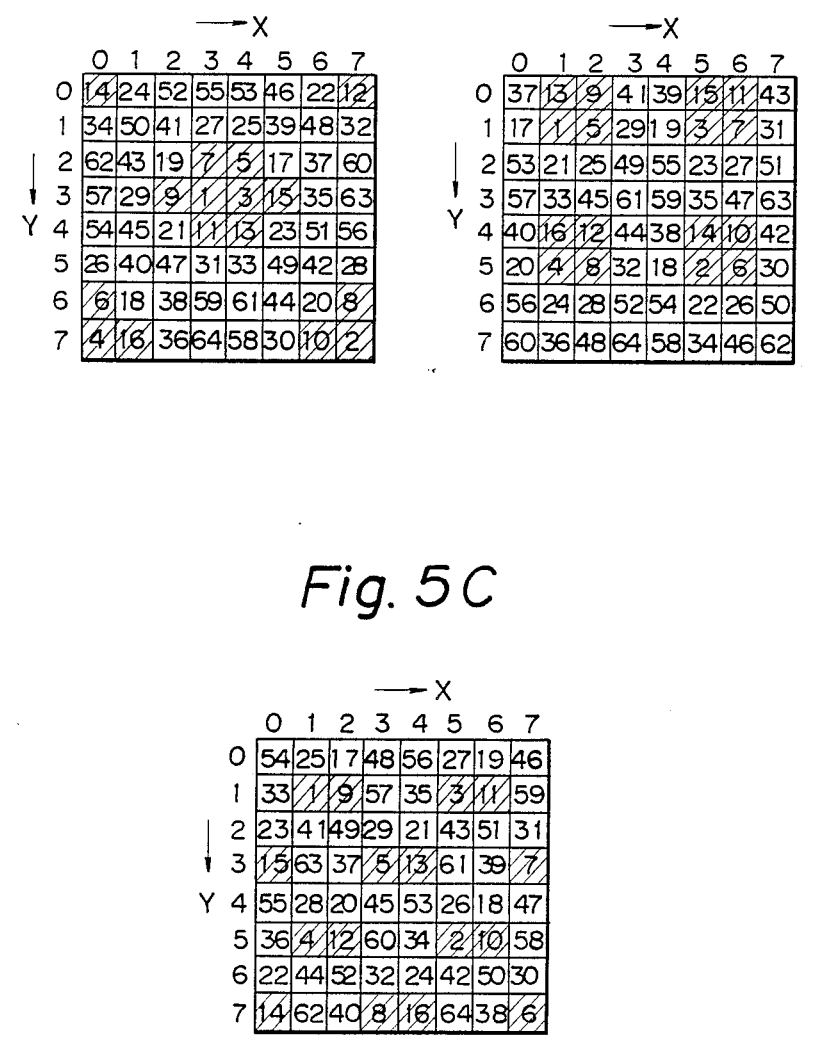

FIGS. 5A to 5C show exemplary basic patterns for the representation of halftone in accordance with this embodiment. In the figures, the hatching shows those positions to which record data bits are assigned when recording density data is representative of 16. FIGS. 6A to 6D show halftone representation patterns each of which is assigned to a respective one of the record colors and derived from the basic pattern of FIG. 5A. FIG. 6E shows a color distribution of a surface on which data are recorded in the density of 16 and based on the halftone representation patterns of FIGS. 6A to 6D. In FIG. 6E, 0 is representative of Y recording, 1 BK recording, 2 M recording, and 3 C recording. FIGS. 7A to 7C show halftone representation patterns each being assigned to a respective of the record colors based on the basic pattern of FIG. 5B. FIG. 7E shows a color distribution of a surface on which data are recorded in the density of 16 and based on the patterns of FIGS. 7A to 7C. In FIG. 7E, 0 is representative of Y recording, 1 BK recording, 2 M recording, and 3 C recording.

FIGS. 8A to 8C show halftone representation patterns each being assigned to a respective one of the record colors and derived from the basic pattern of FIG. 5C. FIG. 8E shows a color distribution on a surface on which data are recorded in the density of 16 and based on the patterns of FIGS. 8A to 8C. In FIG. 8E, 0 is representative of Y recording, 1 BK recording, 2 M recording, and 3 C recording. FIG. 9A shows a halftone representation pattern for Y recording which is produced on the basis of the basic pattern of FIG. 5B. FIG. 9B shows a halftone representation pattern for BK recording which is produced by slightly modifying the basic pattern of FIG. 5C. FIGS. 9C and 9D show halftone representation patterns for, respectively, M recording and C recording which are produced on the basis of the basic pattern of FIG. 5A. FIG. 9E shows a color distribution on a surface on which data are recorded in the density of 16 based on the patterns of FIGS. 9A to 9D. In FIG. 9E, 0 is representative of Y recording, 1 BK recording, 2 M recording, and 3 C recording.

In detail, assume that threshold data (decimal 1 to 64 in this example) are distributed in an 8×8 matrix as shown in each of FIGS. 5A to 5C. When the record density data is representative of 16, dots are printed out as shown by hatching in a small area which corresponds to the 8×8 matrix. Any of the three different patterns of FIGS. 5A to 5C allows, so long as the density data is not greater than 16, the halftone representation patterns (threshold matrices) for the respective colors to be set up while preventing the four different colors from overlapping each other.

For example, assume that the pattern of FIG. 5A is directly used for the Y halftone representation pattern of FIG. 6A, that the center of spots (threshold data 1 and 2) of the pattern of FIG. 5A are shifted by zero square in the X direction and by four squares in the Y direction to produce the BK halftone representation pattern of FIG. 6B, that the centers of spots of the pattern of FIG. 5A are shifted by two squares in the X direction and by three squares in the Y direction to produce the M halftone representation pattern of FIG. 6C, and the centers of spots of the pattern of FIG. 5A are shifted by six squares in the X direction and by three squares in the Y direction to produce the C halftone representation pattern of FIG. 6D. When the respective colors are recorded based on such halftone representation patterns, they appear distributed as shown in FIG. 6E. In FIG. 6E, 0 is representative of Y recording, 1 BK recording, 2 M recording, and 3 C recording.

As described above, when the record density data associated with the different colors is 16, each of the 8×8 small areas is recorded by the same number of dots without causing its associated color to overlap the others. Therefore, when the record density data of the respective colors are not greater than 16, the colors do not overlap each other to provide distinct color recording. It is noteworthy that when the halftone representation patterns (threshold matrices) are set up as shown in FIGS. 6A to 6D, the distance between the centers of spots (threshold data 1 and 2) is greatest between the M pattern (FIG. 6C) and the C pattern (FIG. 6D).

Further, assume that the pattern of FIG. 5B is directly used for the Y intermediate halftone representation pattern of FIG. 7A, that the centers of spots (threshold data 1, 2, 3 and 4) of the FIG. 5 pattern are shifted by two squares in each of the X and Y directions to produce the BK halftone representation pattern of FIG. 7B, that the centers of spots of the FIG. 5B pattern are shifted by zero square in the X direction and by two squares in the Y direction to produce the M halftone representation pattern of FIG. 7C, and that the centers of spots of the FIG. 5B pattern are shifted by two squares in the X direction and by zero square in the Y direction to produce the C halftone representation pattern of FIG. 7D. When the respective colors are recorded in the density of 16 based on such halftone representation patterns, the colors are recorded in a particular distribution as shown in FIG. 7E. In FIG. 7E, 0 designates Y recording, 1 BK recording, 2 M recording, and 3 C recording.

As described above, when the commanded record density of each color is 16, each of the 8×8 small areas is recorded by the same number of dots without causing its associated color to overlap the others. Therefore, when the record density data of the respective colors are not greater than 16, the colors do not overlap each other to provide distinct color recording. It is noteworthy that when the halftone representation patterns (threshold matrices) are set up as shown in FIGS. 7A to 7D, the distance between the centers of spots (threshold data 1, 2, 3 and 4) is greatest between the M pattern (FIG. 7C) and the C pattern (FIG. 7D).

Further, assume that the pattern of FIG. 5C is directly used for the Y intermediate halftone representation pattern of FIG. 8A, that the centers of spots (threshold data 1 to 8) of the FIG. 5C pattern are shifted by five squares in each of the X and Y directions to produce the BK halftone representation pattern of FIG. 8B, that the centers of spots of the FIG. 5C pattern are shifted by seven squares in the X direction and by five squares in the Y direction to produce the M halftone representation pattern of FIG. 8C, and that the centers spots of the FIG. 5C pattern are shifted by six squares in the X direction and by zero square in the Y direction to produce the C halftone representation pattern of FIG. 8D. When the respective colors are recorded in the density of 16 based on such halftone representation patterns, the colors are recorded in a particular distribution as shown in FIG. 8E. In FIG. 8E, 0 designates Y recording, 1 BK recording, 2 M recording, and 3 C recording.

As described above, when the record density data of the different colors are 16, each of the 8×8 small areas is recorded by the same number of dots without causing its associated color to overlap the others. Therefore, when the record density data of the respective colors are not greater than 16, the colors do not overlap each other to provide sharp color recording. It is noteworthy that when the halftone representation patterns (threshold matrices) are set up as shown in FIGS. 8A to 8D, the distance between the centers of spots (threshold data 1, 2, 3 and 4) is greatest between the M pattern (FIG. 8C) and the C pattern (FIG. 8D).

In a particular kind of recording which uses colors Y, M, C and BK as stated above (as well as in the case where BK is not used, when it comes to Y, M and C), mixing of M and C significantly deteriorates color reproduction. Mixing of Y with M and/or with C also deteriorates color reproduction, but to a less significant degree. Mixing of BK turns the mixed portion into black. Although that portion of an original image is originally black and, therefore, mixing of BK is not critical, BK recorded in a low density and over a large area in a shadow portion of an original image wherein BK is scattered as minute points deteriorates the color reproduction of the shadow portion. Eventually, what is desired is, firstly, minimizing mixing of M and C, secondly, minimizing mixing of Y with other colors, and, thirdly, scattering BK as minute points.

For the above reason, in any of the color-by-color halftone representation patterns previously mentioned (FIGS. 6A to 6D, 7A to 7D, and 8A to 8D), the respective color patterns are assigned such that the distance between the centers of spots of the M and C recording patterns becomes greatest, the Y recording pattern is made distinct from the M and C recording patterns so that the centers of spots of the Y pattern are located remote from those of the other patterns, and BK recording pattern is also made distinct from the M, C and Y patterns with respect to the centers of spots and, in addition, scattered as minute points.

An embodiment of the present invention using the above principle is shown in FIGS. 9A to 9D. As shown, the patterns shown in FIGS. 6C and 6D are assigned to, respectively, the colors M and C which have the greatest influence on the quality of color reproduction. Specifically, among the various pattern settings (FIGS. 6A to 6D, 7A to 7D, and 8A to 8D), the particular one (FIGS. 6A to 6D) which locates the centers of spots of the two patterns at the greatest distance from each other are selected and, then, among the four associated patterns selected, two patterns which are greatest in the distance between the centers of spots, i.e., those which result substantially the same pattern when a number of such patterns are developed in a wide area, are assigned to M and C, respectively. As for Y recording, a pattern capable of defining the greatest distance between its spots and those of the M and C patterns, i.e., a pattern different from those of the M and C patterns is selected. Further, as for BK recording, a pattern which defines the greatest distance between its spots and those of the M, C and Y patterns is selected. Specifically, the patterns assigned to M and C which significantly degrade color reproduction when mixed together are provided with two spots points each, so that their spots become greatest. The pattern assigned to Y which also effects color reproduction but less significantly than M and C is provided with four spots which are scattered between those of M and C. Further, the pattern assigned to BK is provided with eight spots which are scattered between those of M, C and Y.

Still another embodiment of the present invention will be described with reference to FIGS. 10A to 10D, 11A to 11D, 12A to 12D and 13A to 13D.

FIGS. 10A to 10D each shows an exemplary basic pattern for the representation of halftone in accordance with this particular embodiment. In the figures, the hatching shows those positions to which recording data bit are assigned when the record density data is representative of 16. FIGS. 11A to 11C show halftone representation patterns which are assigned one to each record color based on the basic patterns of FIGS. 10B to 10C. FIG. 11D shows the distribution of colors which are recorded based on the above patterns and in the record density of 16. FIGS. 12A to 12C show other examples of halftone representation patterns which are assigned to the individual recording colors. FIGS. 13A to 13C show still other examples of halftone representation patterns which are assigned to the individual colors. FIG. 13D shows the distribution of colors recorded on the basis of such patterns in the density of 20.

In detail, assume that threshold data (decimal 1 to 64 in the figures) are distributed in an $8 \times 8$ matrix as shown in each of FIGS. 10A to 10C. When the record density commanded is 16, the hatched regions are recorded in a small area which corresponds to the $8 \times 8$ matrix. Any of those patterns allows color-by-color halftone representation patterns (threshold data matrices) to be set up with the four colors prevented from overlapping each other, so long as the record density is not greater than 16.

Assume that the centers of spots (thresholds 1 and 2) of the FIG. 10B pattern are shifted by two squares in the X direction and two squares in the Y direction to produce an M halftone representation pattern as shown in FIG. 11A, the centers of spots of the FIG. 10B pattern are shifted by six squares in the X direction and two squares in the Y direction to produce a C halftone representation pattern as shown in FIG. 11B, and the centers of spots (threshold data 1, 2, 3 and 4) of the FIG. 10C pattern are shifted by two squares in each of the X and Y directions to produce a Y halftone representation pattern as shown in FIG. 11C. When the respective colors are recorded in the density of 16 based on such representation patterns, the colors appear distributed as shown in FIG. 11D.

As described above, so long as the density commanded is 16, the entire small area corresponding to the $8 \times 8$ matrix is recorded with the different colors prevented from overlapping each other and with all the colors rendered by the same number of dots. Therefore, for the densities not greater than 16, the different colors do not overlap each other to realize distinct color recording. It is noteworthy that when the halftone representation patterns (threshold matrices) for the respective colors are set up as shown in FIGS. 11A to 11C, the distance between the centers of spots (threshold values 1 and 2) is greatest between the M pattern (FIG. 11A) and the C pattern (FIG. 11B).

Assume that the FIG. 10A pattern (or a pattern produced by shifting its spots in the X and Y directions on the matrix) is assigned to M, and the FIG. 10B pattern (or a pattern produced by shifting its spots in the X and Y directions) is assigned to C. This shortens the distance between the spots of M and C, compared to a case wherein the patterns (FIGS. 11A and 11B) prepared by shifting spots of the same pattern (the FIGS. 10B pattern and its shifted version) are assigned each to a respective one of M and C, as previously stated. Preferably, therefore, the patterns assigned to M and C are those which are produced by shifting the spots of the same basic pattern (FIG. 10B) relatively by the maximum amount.

Based on the above principle, the basic pattern of FIG. 10A may be modified to produce two patterns whose spots are offset by the maximum amount relatively from each other, the two patterns being assigned to M and C. In such a case, the pattern for Y may be implemented with that of FIG. 11B which has spots intervening between those of the M and C patterns.

Furthermore, the M pattern may be implemented with the pattern of FIG. 10C, the C pattern with a pattern produced by shifting the spots of the FIG. 10C pattern by two squares in each of the X and Y directions, and the Y pattern with a pattern produced by shifting or modifying the FIG. 10D pattern such that its spots intervene between those of the M and C patterns.

FIGS. 12A to 12C show exemplary pattern assignment which is applicable to a $10 \times 10$ matrix, and FIGS. 13A to 13C show another example of the same. In FIGS. 12A to 12C, the hatching indicates those regions to which bits representative of recording are assigned when the density commanded is 40. In the example shown in FIGS. 12A to 12C, the screen angle differs by each 45° from color to color and the pitch by each $1/\sqrt{2}$. This kind of pattern assignment is applicable to image recording which uses not more than 101 tones.

In FIGS. 13A to 13C, the hatching indicates those regions to which recording dots are assigned when the density commanded is not greater than 20. In this particular example, patterns produced by so shifting the spots of the same pattern as to set up the maximum phase are used one for each of the M and C patterns. For the Y pattern, there is used a pattern produced by shifting the phase of a pattern which differs in screen angle by 45° from the patterns used for the M and C patterns and has a spot pitch of $1/\sqrt{2}$, such that the resulting spots are farthest from those of M and C. As shown in FIG. 14D, such selection of patterns prevents the colors from overlapping each other even when the density commanded is less than 20 and even leaves a room, which accommodates even higher densities without causing the colors to overlap for some combinations of densities of colors.

In any of the examples described above, the distance between the centers of spots of the M and C patterns is longer than the distance between themselves and the centers of spots of the Y pattern. The centers of spots of the Y pattern are interposed between those of the M and C patterns, and the number of the centers of spots of the Y pattern is greater than those of the M and C patterns.

While the recording density of each color is low, the different colors do not overlap. This, coupled with the fact that M and C do not overlap up to relatively high tones, ensures distinct color recording.

Hereinafter will be described a digital color copier to which the present invention is applied.

Figure 14:
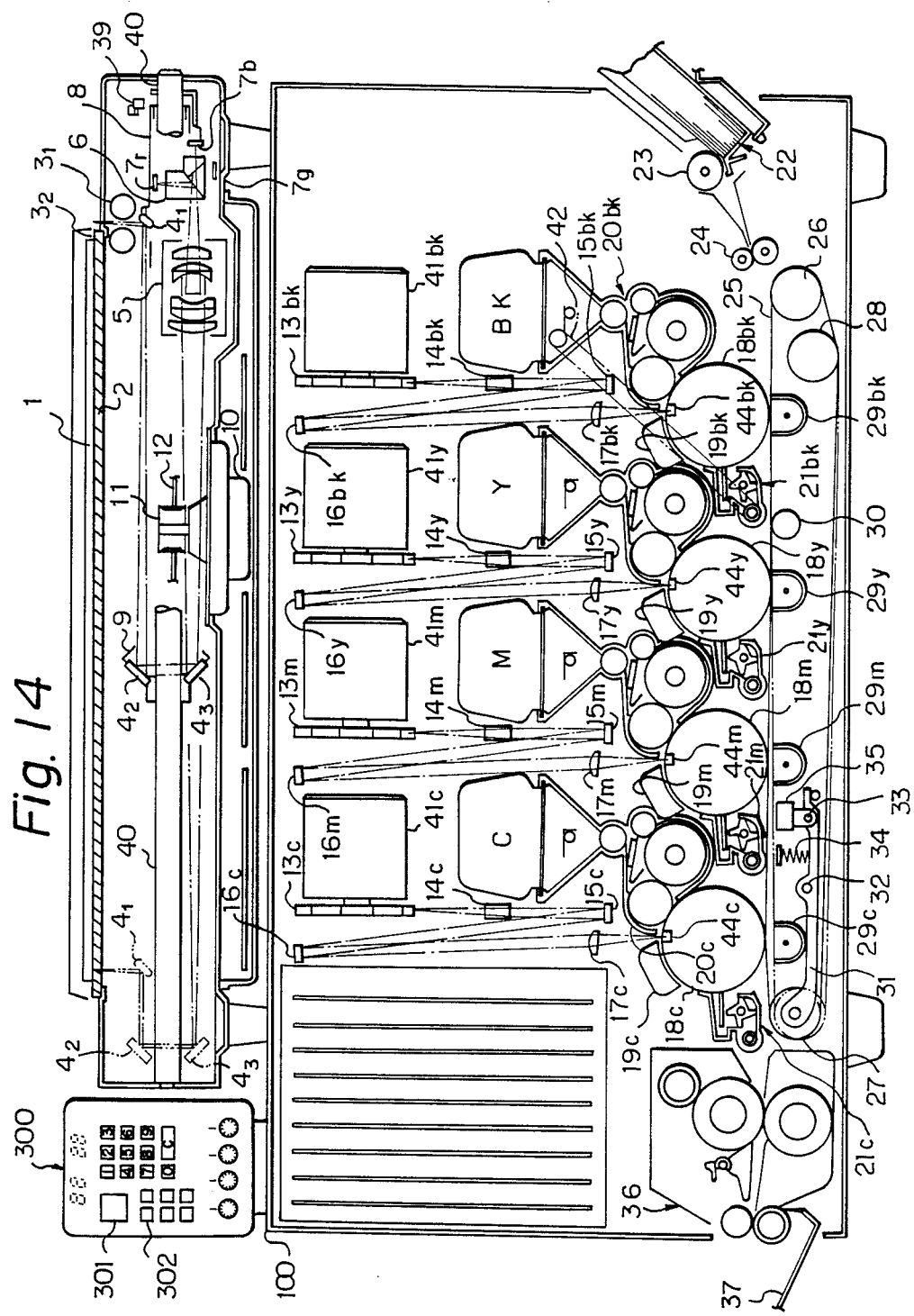
FIG. 14 is a block diagram showing a digital color copier to which the present invention is applied.
Figure 15A:
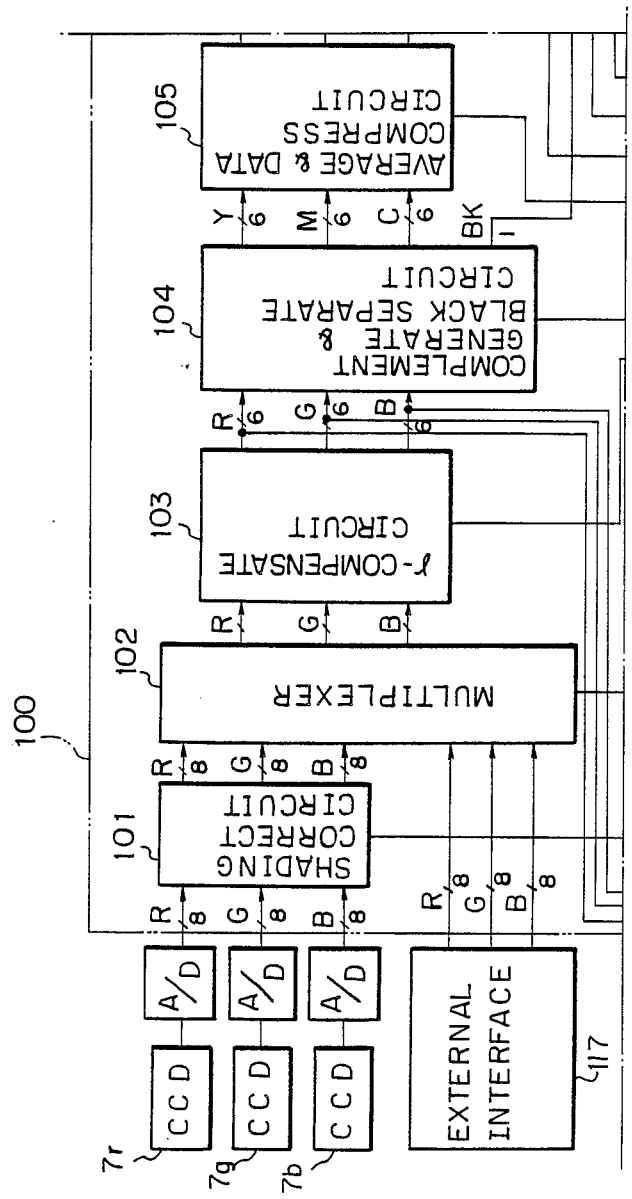
FIGS. 15-15D are block diagrams showing an electrical system of the copier as shown in FIG. 14.
Figure 15B:
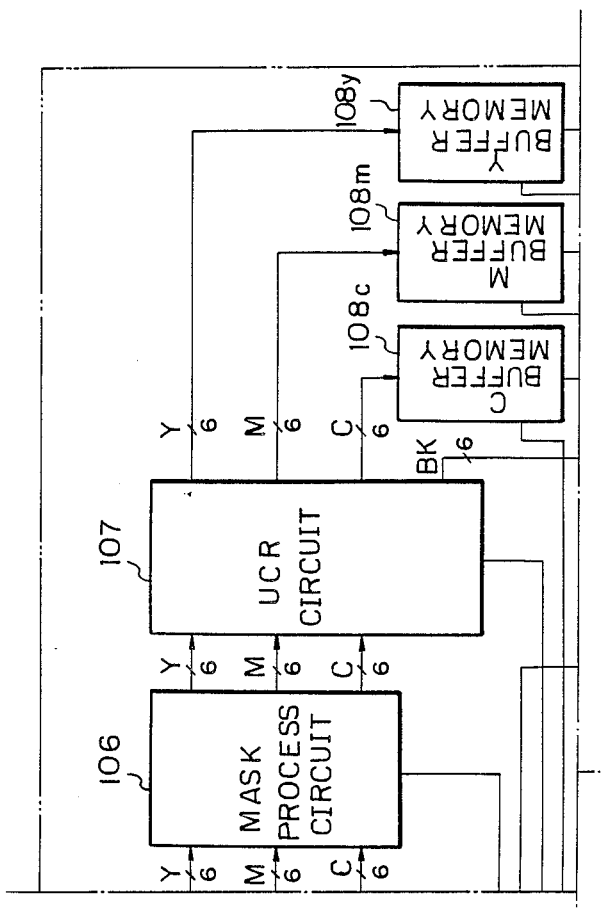
Figure 15C:
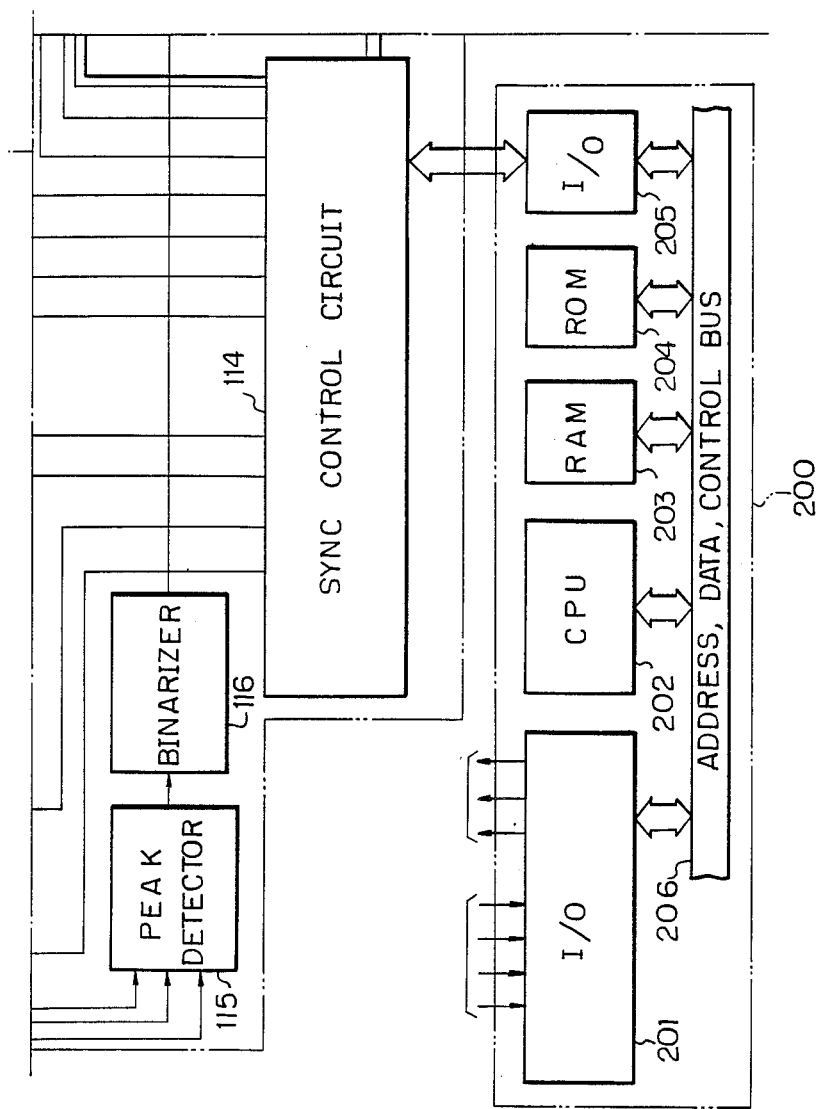
Figure 15D:
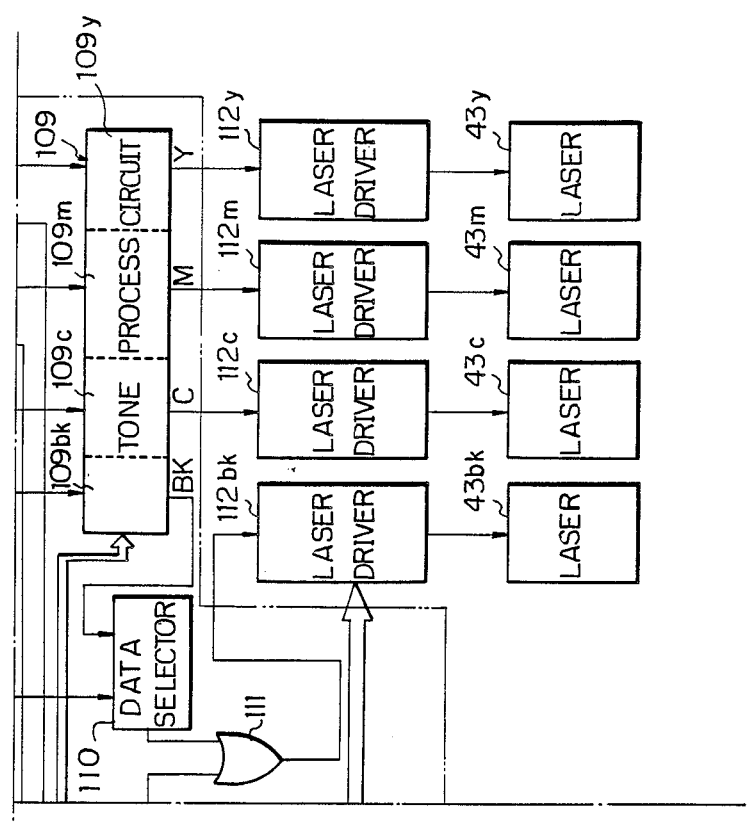

Referring to FIG. 14, an original document 1 is laid on a glass platen 2 to be illuminated by fluorescent lamps $3_1$ and $3_2$. A reflection from the lamps $3_1$ and $3_2$ is sequentially reflected by a first mirror $4_1$, a second mirror $4_2$, and a third mirror $4_3$ to reach a dichroic prism 6 through a lens 5. The prism 6 serves to separate the incident light into red (R), green (G) and blue (B) components. The R, G and B components of the light are incident to charge coupled devices (CCD) 7r, 7g and 7b, respectively. That is, the red light is incident to the CCD 7r, the green light to the CCD 7g, and the blue light to the CCD 7b.

The lamps $3_1$ and $3_2$ and the first mirror $4_1$ are mounted on a first carriage 8 while the second and third mirrors $4_2$ and $4_3$ are mounted on a second carriage 9. The second carriage 9 driven at half the speed of the first carriage 8 so that the optical length from the document 1 to the CCDs 7r, 7g and 7b is maintained constant. To scan the document 1, the carriages 8 and 9 are moved from the right to the left as viewed in FIG. 14. A carriage drive wire 12 is wound around a carriage drive pulley 11 which is rigidly mounted on the output shaft of a carriage drive motor 10. The first carriage is connected to the carriage drive wire 12. The wire 12 is also wound around a movable pulley, not shown, which is mounted on the second carriage 9. In this construction, as the motor 10 rotates in the forward and reverse directions, the carriages 8 and 9 are driven in the forward (scanning stroke) and reverse (return stroke) directions.

When the first carriage 8 is in its home position as shown in FIG. 14, a home position sensor 39 which is implemented with a reflection type photosensor senses it. Specifically, when the carriage 8 is moved away from the home position to scan the document 1, the sensor 39 is turned off; as the former is returned to the home position, the latter is turned on. The carriage 8 is brought to a halt when the sensor 39 turns from the off-state into the on-state.

Referring to FIG. 15, the outputs of the CCDs 7r, 7g and 7b are individually subjected to analog-to-digital conversion and, then, applied to an image processing unit 100. The image processing unit 100 applies required processing to the incoming digital CCD outputs and, then, converts them into binary signals which are individually fed to laser drivers 112 bk responsive to black BK color data, laser drive 112y responsive to Y color data, laser drive 112m responsive to M color data, and a laser driver 112c responsive to C color data. The laser drivers 112bk, 112y, 112m and 112c energize, respectively, semiconductor lasers 43bk, 43y, 43m and 43c each of which emits a laser beam modulated by the recording color signal (binary signal).

Turning back to FIG. 14, the laser beams issuing from the lasers 43bk, 43y, 43m and 43c are reflected by, respectively, rotary polygon mirros 13bk, 13y, 13m and 13c to be transmitted through f-$\theta$ lenses 14bk, 14y, 14m and 14c. The laser beams from f-$\theta$ lenses 14bk, 14y, 14m and 14c are sequentially reflected by, respectively, fourth mirrors 15bk, 15y, 15m and 15c and fifth mirrors 16bk, 16y, 16m and 16c and, thence, incident to photoconductive drums 18bk, 18y, 18m and 18c through cylindrical lenses 17bk, 17y, 17m and 17c. The rotary polygon mirrors 13bk, 13y, 13m and 13c are rigidly mounted on, respectively, the output shafts of exclusive motors 41bk, 41y, 41m and 41c to be thereby driven at a constant speed. By the rotation of those polygon mirrors, the laser beams are individually moved in a direction perpendicular to the rotational direction (clockwise) of the photoconductive drums, i.e., a direction parallel to the axes of the drums. The laser canning system shown in FIG. 14 may be implemented with conventional know prior art system.

The surfaces of the photoconductive drums 18bk, 18y, 18m and 18c are uniformly charged by, respectively, charge scorotrons 19bk, 19y, 19m and 19c which are connected to a negative high-tension generator. As any of the laser beams modulated by its associated recording signal illuminates the surface of its associated photoconductive drum, the charge on the drum surface is dissipated to ground via the drum body to disappear. Each laser is turned off in response to high document densities and turned on in response to low document densities. This sets up surface potentials of about −800 V and about −100 V on, respectively, those portions of the drums 18bk, 18y, 18m and 18c which correspond to comparatively dark portions and comparatively light portions of the document, whereby electrostatic latent images are provided on the individual drums according to the shades of color of the document. These latent images are individually developed by a black developing unit 20bk, a yellow developing unit 20y, a magenta developing unit 20m, and a cyan developing unit 20c, so that a black, a yellow, a magenta and a cyan toner image are produced on the drums 18bk, 18y, 18m and 18c, respectively. Toner in each of the developing units 20bk, 20y, 20m and 20c is agitated to be charged to positive polarity while, at the same time, each developing unit is biased to about −200 V by a developing bias generator, not shown. Hence, the toner is deposited in those areas of the drum where the surface potential is higher than the developing bias, thereby providing the toner image.

Papers are fed one by one from a paper cassette 2 by feed rollers 23. Each paper is then deiven by regist rollers 24 to a transfer belt 25 at a predetermined timing. As the belt 25 is moved, the paper is sequentially moved along a predetermined path below the drums 18bk, 18y, 18m and 18c while, at the same time, the black, yellow, magenta and cyan toner images are sequentilly transferred to the paper by transfer corotrons, which are disposed below the belt 25. The paper is fed toward a fixing unit 36 to have the toner images fixed and, then, driven out of the copier to a tray 37.

Toner remaining on the drums 18bk, 18y, 18m and 18c after the image transfer are removed by cleaner units 21bk, 21y, 21m and 21c, respectively. The cleaner unit 21bk for collecting the black toner and the black developing unit 20bk are communicated by a toner collecting pipe 42, so that the toner collected by the cleaner unit 21bk is returned to the developing unit 20bk. The yellow, magenta and cyan toner collected, respectively, by the cleaner units 21y, 21m and 21c each contains the toner of different color which has been supplied at the preceding developing station because, for example, the black toner is undesirably transferred from the paper back to the drum 18y. For this reason, the yellow, magenta and cyan toner collected are not reused.

The transfer belt 25 for feeding the paper from the drum 18bk toward the drum 18c is passed over an idle roller 26, a drive roller 27, an idle roller, and an idle roller 30. The drive roller 27 drives the belt 25 in the counterclockwise direction as viewed in FIG. 14. The drive roller 27 is journalled to the left end of a lever 31 which is rotatably mounted on a shaft 32. Pivotted to the right end of the lever 31 is a plunger 35 of a black mode setting solenoid, not shown. A coiled compression spring 34 is loaded between the plunger 35 and the shaft 32 to constantly bias the lever 31 in the clockwise direction.

As shown in FIG. 14, while the black mode setting solenoid is deenergized (color mode), the transfer belt 25 is held in contact with the drums 18bk, 18y, 28m and 18c. Under this condition, when the belt 25 is loaded with a paper and the toner images are formed on the individual drums 18bk, 18y, 18m and 18c, the toner images of different colors are sequentially transferred to the paper as the belt 25 is rotated (color mode). When the black mode setting solenoid is energized (black mode), the lever 31 is rotated counterclockwise against the action of the coil spring 34. The lever 31 in turn lowers the drive roller by 5 mm and, thereby, moves the belt 25 clear of the drums except for the drum 18bk. In this condition, the paper on the belt 25 is allowed to make contact with the drum 18bk only, resulting that oly the black toner image is transferred to the paper (black mode). Since the paper does not make contact with the drums 18y, 18m and 18c, the toner remaining on those drums are prevented from touching the paper. This entirely frees the paper from contamination in yellow, magenta and cyan. That is, in the black mode, the same copying operation as in an ordinary mono-color copier is performed.

A console board 300 is provided with a copy start switch, a color/black mode select switch 302, other various key switches, a character display, indicators, and others. The color/black mode select key 302 is operated such that, immediately after the copier has been switched on, the switch key is extinguished to select the color mode and, when the switch is closed for the first time, the switch key glows to select the black mode and to energize the black mode setting solenoid and, when the switch is closed next, the switch key is extinguished to set the color mode and to deenergize the black mode setting solenoid.

The operation timings of major sections of the copier are as follows. The laser 43bk is activated by a recording signal substantially simultaneously with the start of a scanning stroke of the first carriage 8. The other lasers 43y, 43m and 43c are energized delayed by, respectively, periods of time of Ty, Tm and Tc of movement of the transfer belt 25 which correspond to the distances as measured from the drum 18bk to the drums 18y, 18m and 18c. The transfer corotrons 29bk, 29y, 29m and 29c are activated, respectively, on the lapse of periods of time since the activation of the lasers 43bk, 43y, 43m and 43c (periods of time which are consumed for the radiated points of the individual drums to reach their associated corotrons).

Referring to FIG. 15, the image processing unit 100 converts three-color image signals read by the CCDs 7r, 7g and 7b into a black (BK), a yellow (Y), a magneta (M) and a cyan (C) record signal. The BK record signal is fed to the laser driver 112bk immediately. As for the other record signals Y, M and C, record color tone data on which the individual signals are based are lodged in, respectively, buffer memories 10y, 108m and 108c and, then, read thereoutof on the lapse of periods of time Ty, Tm and Tc to be converted into record signals. Hence, the record signals Y, M and C are fed to the laser drivers 112y, 112m and 112c each with a delay. While in a copier mode the three-color signals from the CCDs 7r, 7g and 7b are fed to the image processing unit 100 as stated above, in a graphics mode three-color signals are applied to the unit 100 from the outside of the copier via an external inteface 117.

The image processing unit 100 includes a shading correcting circuit 101 which applies shading correction to the tone data, which are the 8-bit AD-converted versions of the outputs of the CCDs 7r, 7g and 7b, for compensating for optical irregularity of illuminance, scattering of the sensitivity of unit elements built in the CCDs 7r, 7g and 7b, etc. A multiplexer 102 selects either one of the tone data output by the correction circuit 101 and the tone data output by the external interface 117. The output (tone data) of the multiplexer 102 is applied to a γ-compensating circuit 103 which is adapted to adjust tones (input tone data) to the characteristic of the drums 18bk, 18y, 18m and 18c, to change tones as desired in response to a command which may be keyd in through the console 300, and to change each of the 8-bit inputs to a 6-bit output. Since each output of the γ-compensating circuit 103 has six bits as mentioned, it is representative of one of sixty-four different tones. The three-color tone data individually representative of the tones of R, G and B as output by the γ-compensating circuit 103 are applies to a complement generating and black separating circuit 104.

The complement generating and black separating circuit 104 serves to generate complementary colors, i.e., to translate the color signals read into record color signals. Specifically, the circuit 104 translates R tone data into C tone data, G tone data into M tone data, and B tone data into Y tone data. The C, M and Y tone data are directly applied to an averaging and data compressing circuit 105. When all of the tone data are representative of high density, all that is required is printing data in black. In this condition, digital comparators built in the circuit 104 individually compare the C, M and Y tone data with a reference data which is selected through a threshold setting switch. Each of the digital comparators compares 8-bit data with 8-bit data, i.e., 8-bit data (input data) produced by adding upper two bits of (logical) low level (L) to the six bits of tone data with 8-bit data (reference data) having the lowermost one bit and upper three bits which are L level and the second to fourth bits from the last which are representative of reference data as entered through the switch. The output of each digital comparator becomes L if the input data is lower than the reference data, and becomes H if the former is higher than the latter, the output being applied to a NAND gate. The NAND gate delivers its output, which becomes L (black) when the outputs of all of the comparators are L and H (while) when any of them is H, to a data selector 110.

More specifically, while the 6-bit tone data input to each comparator lies in the range of 0 to 3 FH in terms of hexadecimal system, an arrangement is made such that it is representative of black when 0 and white as the value increases; in the event of writing the output in black, L is representative of black and H, white. Hence, two bits (Q6, 7) of the 8-bit input data of the most significant bit (MSB) side are made L, and the C, M or Y tone data is lodged in the lower six bits (Q0 to 5). Use is made of a rotary dip switch to accommodate seven consecutive levels for comparison. What is of concern here is setting black levels and, hence, extending the range of black to the white side excessively is undesirable from the color balance standpoint because such would allow black to occur frequently, although halftone (gray) would be treated as black to enhance resolution. For this reason, the fifth and sixth bits are also made L in order to allow several consecutive levels to be set up to cover up levels to the medium one. Since the level setting does not need to be so minute, the least significant bit (LSB) is made L with a value entered through the dip switch loaded in the intermediate three bits (P1 to P3).

Assuming that the value selected through the dip switch is "010", the reference value is "0000010". When all of the C, M and Y data are lower than such a reference value, i.e., from decimal 0 to 3, the outputs of the comparators are L to turn the BK output into L (black). If desired, three exclusive dip switches may be assigned to the individual colors C, M and Y so as to effect color-by-color comparison. Further, a maximum-minimum setting switch may be assigned to each of the colors to set up a particular setting range in order to output any particular color in a black pattern with high resolution.

The averaging and data compressing circuit 105 averages 4×4 image data each having six bits of tone data for one image, producing 6-bit tone data. While in this particular embodiment the input data (output of each CCD) is AD-converted to become 8-bit data and, then, converted into 6-bit data by $\gamma$ correction because the input and output images share the same processing principle with respect to the size, the output data to each laser driver is laser on-off (one bit) data. The density can be split into 64 consecutive tones based on the 6-bit input data. Hence, the densities of 8×8 pixels of input data are averaged to provide density data. Such an averaging operation also serves to compress the amount of data and the processing rate to 1/64, thereby cutting down the required capacity of data storage as well as hardware cost.

Hereinafter will be described a mask processing circuit 106 and a UCR processing circuit 107. The operation for implementing mask processing is generally expressed as:

$$\begin{bmatrix} Y_o \\ M_o \\ C_o \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y_i \\ M_i \\ C_i \end{bmatrix}$$

where Yi, Mi and Ci are pre-masking data, and Yo, Mo and Co are post-masking data.

Also, UCR processing is generally given by:

$$\begin{bmatrix} Y_o' \\ M_o' \\ C_o' \\ BK_o' \end{bmatrix} = \begin{bmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{bmatrix} \begin{bmatrix} Y_o \\ M_o \\ C_o \end{bmatrix}$$

Therefore, in this particular embodiment, new coefficients are produced by using the above equations and the products of their coefficients to perform the following operation:

$$\begin{bmatrix} Y_o' \\ M_o' \\ C_o' \\ BK_o' \end{bmatrix} = \begin{bmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{bmatrix} \begin{bmatrix} a_{11} & a_{12} & a_{13} \\ a_{21} & a_{22} & a_{23} \\ a_{31} & a_{32} & a_{33} \end{bmatrix} \begin{bmatrix} Y_i \\ M_i \\ C_i \end{bmatrix}$$

$$= \begin{bmatrix} a_{11}'' & a_{12}'' & a_{13}'' \\ a_{21}'' & a_{22}'' & a_{23}'' \\ a_{31}'' & a_{32}'' & a_{33}'' \\ a_{41}'' & a_{42}'' & a_{43}'' \end{bmatrix} \begin{bmatrix} Y_i \\ M_i \\ C_i \end{bmatrix}$$

The coefficients ($a_{11}''$ and others) of the above equation are computed beforehand and substituted for in the equation so as to store in a ROM the results of computation ($Y_o'$ and others) corresponding to the expected inputs Yi, Mi and Ci (each having six bits) of the mask processing circuit 106. In this embodiment, therefore, the mask processing circuit 106 and UCR processing circuit 107 are constituted by a pair of ROMs, so that data stored in those addresses of the circuit 106 which are designated by the inputs Y, M and C are fed to the circuit 107 and, therefrom, to buffer memories 108y, 108m and 108c as well as to a tone processing circuit 109. Generally speaking, the mask processing circuit 106 corrects the Y, M and C signals in conformity to the spectral reflection wavelength characteristic of toner, which is used to record an image, while the UCR processing circuit 107 performs correction for color balance with respect to superposition of toner of different colors.

The buffer memories 108y, 108m and 108c of the image processing unit 100 simply serve to generate time delays which individually correspond to the distances between the photoconductive drums. While data are written in the buffer memories 108y, 108m and 108c at the same time, they are read out of the buffer memorys 108y, 108m and 108c timed to the activation of the lasers 43y, 43m and 43c, respectively. Assuming that the maximum paper format which the copier accommodates is A3, the capacities required of the buffer memories 108y, 108m and 108c are, respectively, substantially 24%, 48% and 74% of the maximum necessary amount for an A3 document at minimum. Assuming that each of the CCDs 7r, 7g and 7b has a pixel density of 400 dpi (dots per inch; 15.75 dots/mm), the buffer memories 108y, 108m and 108c need only about 87K bytes, about 174K bytes, and about 261 bytes, respectively. Since this particular embodiment handles sixty-four tones and 6-bit data, the buffer memories 108y, 108m and 108c are provided with capacities of 87K bytes, 174K bytes, and 261K bytes, respectively. As regards memory addresses, the buffer memories 108y, 108m and 108c have, respectively, 116K×6 bits, 232K×6 bits, and 348K×6 bits on a six bits basis.

The tone processing circuit 109 is made up of a BK tone processing section 109bk, a Y tone processing section 109y, an M tone processing section 109m, and a C tone processing section 109c. The function assigned to the tone processing circuit 109 is processing the Y, M, C and BK record desity data to produce particular patterns associated therewith. Six-bit tone data is capable of representing density data of sixty-four different tones (sixty-five tones taking account of 0 to which no pattern is assigned). Ideally, if the diameter of a dot is variable over sixty-four consecutive steps, desirable resolution is preserved. In practice, however, the dot diameter modulation available with a laser beam type electrophotographic system stably is over four steps at maximum. For this reason, it is a common practice to adopt either the density pattern method or the combination of the density pattern method and the beam modulation. The processing system in accordance with this embodiment is such that sixty-four tones are represented by using an 8×8 matrix pattern.

Figure 16:
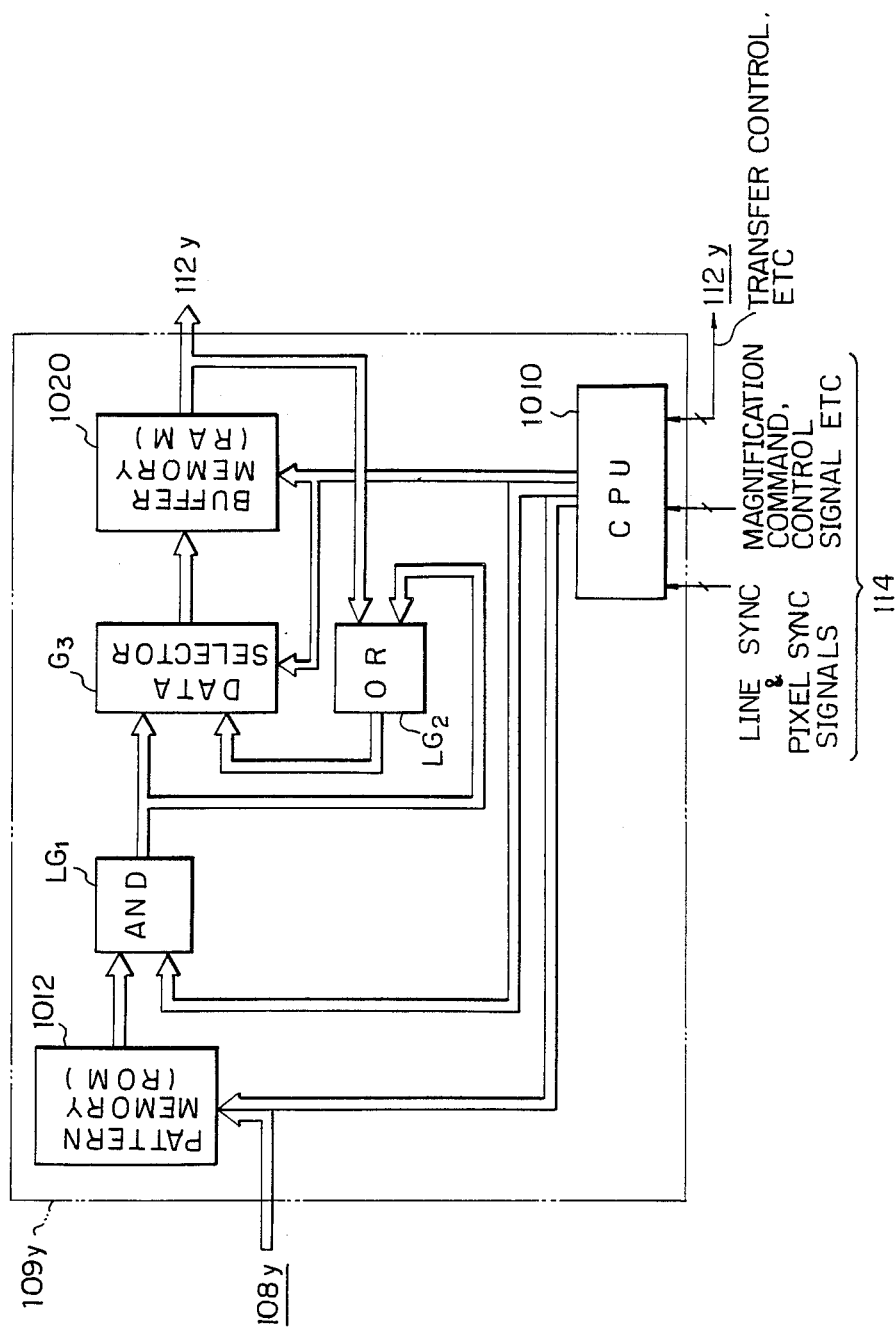
FIG. 16 is a block circuit showing a tone processing circuit of FIG. 15.

Referring to FIG. 16, a specific construction of the Y tone processing section 109y is shown. The tone processing section 109y includes a pattern memory which is implemented with a ROM. Stored in the pattern memory 109y are sixty-four different halftone representation patterns which are represented by record data bits and derived from the halftone representation pattern (threshold distribution pattern) as shown in FIG. 1A, 9A or 11C, in which threshold data are distributed in an 8×8 matrix. Specifically, the pattern memory 109y stores a density 1 pattern to be specified by density 1 and produced by writing a record data bit only in that position of the pattern where the threshold is 1 and writing non-record data bits in the other positions, ..., a density i pattern to be specified by density i and produced by writing record data bits in those positions where the threshold is smaller than i and writing non-record data bits in the other positions, ..., and a density 64 pattern to be specified by density 64 and produced by writing record data bits in those positions where the threshold is smaller than 64 (i.e. all of the positions). In such a pattern assigned to Y, the centers of spots are located at the center and the four corners of the 8×8 matrix. In FIGS. 1A, 9A or 11C, the hatched squares show those positions to which record data bits are assigned when the density data is representative of 32.

The other tone processing sections 109m, 109c and 109bk are constructed in the same manner as the tone processing section 109y except for the halftone pattern data which are stored in their pattern memories, not shown. Specifically, the pattern memory of the section 109m stores sixty-four patterns which are derived from the original pattern as shown in FIGS. 1B, 9C or 11A, and the pattern memory of the section 109bk stores sixty-four patterns which are derived from the original pattern as shown in FIGS. 1D, 9B or 11A.

Halftone processing for Y which is performed by the tone processing section 109y will be described by way of example. The operation of the section 109y which will be described also applies to the other sections. It is to be noted that in this particular embodiment Y, M and C are recorded in the same paper in a full-color record mode, but BK is recorded only in black in a black (monocolor) tone record mode.

As stated earlier, one of a group of halftone representation patterns (mother matrix patterns) is specified by record density data and, then, data of a child matrix pattern which forms a part of the mother pattern is extracted, the resultant image data being produced as assigned to that particular tone data. This allows the tone pattern to be changed on a child matrix pattern basis to thereby enhance resolution, whereby the reproducibility of the contour of a face in a picture, the edges of line images, and others is enhanced. As for a contour of an image, for example, since a child matrix pattern corresponding to the contour forms a part of a high density mother matrix pattern, the contour appears clear-cut; in a low density portion outside of the contour, a child matrix pattern corresponding to that portion forms a part of a low density mother matrix pattern, resulting that a low density image appears to render the contour sharp. Furthermore, since it is the record density data which specifies a large (mother) matrix pattern, smoothness is enhanced in those portions wherein the tone changes monotonously little by little. That is, a number of child matrix patterns constituting a mother matrix pattern and each corresponding to record density data are arranged in that area of a reproduced image which accommodates one mother matrix pattern.

Those mother matrix patterns which are close to each other in the density of representation are similar to each other. Hence, in an image portion where the density changes little by little, an image reproduced by a number of child matrix patterns which constitute a single mother matrix pattern appears similar to a single particular mother matrix pattern and, therefore, the number of tones represented is substantially the same as that attainable with the the mother matrix patterns. In addition, as shown in FIGS. 1A to 1D, 9A to 9D, or 11A to 11D, any desired screen angle can be selected on a color-by-color basis. As described in detail later, assume that a mother matrix pattern MMP is divided into m in the main scanning direction and n in the subscanning direction, i.e., into m×n child matrix patterns $CMP_{11}$ tp $CMP_{mn}$, where the former half of each subscript shows the position of a child matrix pattern in the mother matrix pattern with respect to the main scanning direction and the latter half, the position of the former in the latter with respect to the subscanning direction. Let the mother matrix pattern MMP be expressed as:

$$MMP = \sum_{j=1}^{n} \sum_{i=1}^{m} CMP_{ij}$$

Likewise, assume that one mother matrix pattern of image data is represented by m×n tone data which is expressed as $$\sum_{j=1}^{n} \sum_{i=1}^{m} ICD_{ij},$$

i.e., $ICD_{11}$ to $ICD_{mn}$. Then, data of a child matrix patterns $CMP_{ij}$ of a mother matrix pattern which is specified by tone data $ICD_{ij}$ is produced as a bit corresponding to the tone data $ICD_{ij}$. That is, the positions of child matrix patterns each for obtaining image data in correspondence to a respective one of the tone data of the arrangement and number, m×n, which constitute one mother matrix pattern corresponds to the positions of the tone data in the mother matrix pattern.

In the above condition, in a reproduced image, while the data recorded are those of the individual mother matrix patterns as specified by the record data, as regards the position, m×n child matrix patterns of predetermined positions which complete one mother matrix pattern are arranged in an area of the reproduced image which is the same in size with one mother matrix pattern. Since those mother matrix patterns which are close in representation density to each other are analogous, when it comes to an image area wherein the density changes little by little, an image reproduced by m×n child matrix patterns becomes further analogous to a particular single mother matrix pattern. The resultant number of tones which may be represented is equivalent to that achievable with the mother matrix patterns and, therefore, to that of prior art density representation which relies on a fixed density pattern system. As regards a contour of an image, a child matrix pattern corresponding to the contour forms part of a high density mother matrix pattern to render the contour sharp; in a low density area outside of the contour, a child matrix pattern corresponding thereto forms a part of a low density mother matrix pattern to reproduce a low density image to thereby further enhance the sharpness of the contour.

One group of mother matrix patterns each having an $8 \times 8$ bits (pixels) construction are capable of representing sixty-four different tones (or sixty-five tones taking account of density 0) which are assigned one to each of density Nos. 1 to 64. As previously stated, each mother matrix is derived from the original mother pattern (1A, 9A or 11B).

When a mother matrix pattern is divided into two, child matrix patterns A and B are defined as shown in FIG. 18A or 18B. As regards the division of a mother matrix pattern of FIG. 18A, an odd one of one line of record density data specifies one of the sixty-four different mother matrix patterns which corresponds in density to the data and, then, the left half A of the particular mother matrix pattern is picked up as record data; an even one is used to specify a mother matrix pattern corresponding in density to the data and, then, the right half B of that mother matrix pattern is picked up as record data. In the division shown in FIG. 18B, each of the record density data on an odd line specifies one of the sixty-four mother matrix patterns corresponding in density thereto and, then, the upper half A of that mother matrix pattern is picked up as record data; each of record density data on an even line specifies a mother matrix pattern corresponding in density thereto and, then, the lower half B thereof is picked up as record data.

FIG. 18C shows a mother matrix pattern which is divided into four child matrix patterns A to D. In this case, one of sixty-four mother matrix patterns is specified by odd record density data on an odd line and, then, data in the left upper quarter (area A in FIG. 18C) of that mother matrix is picked up; one of sixty-four mother matrix patterns is specified by even record density data on the odd line and, then, data in the right upper quarter (area B in FIG. 18C) of that mother matrix pattern is picked up; one of sixty-four mother matrix patterns is specified by odd record density data on an even line and, then, data in the left lower quarter (area C in FIG. 18C) is picked up; and one of sixty-four mother matrix patterns is specified by even record density data on the even line and, then, data in the right lower (area D in FIG. 18C) quarter of the mother matrix is picked up. The same principle applies to a case wherein the mother matrix pattern is divided into sixteen child matrix patterns A to P, FIG. 18D, and a case wherein the mother matrix pattern is divided into sixty-four child matrix patterns A, B, C and so on, FIG. 18E, i.e., a particular mother matrix pattern is specified by record density data and, then, image data associated with a child matrix pattern which corresponds to the position of the mother matrix pattern to which the density data is assigned is picked up.

Figure 23:
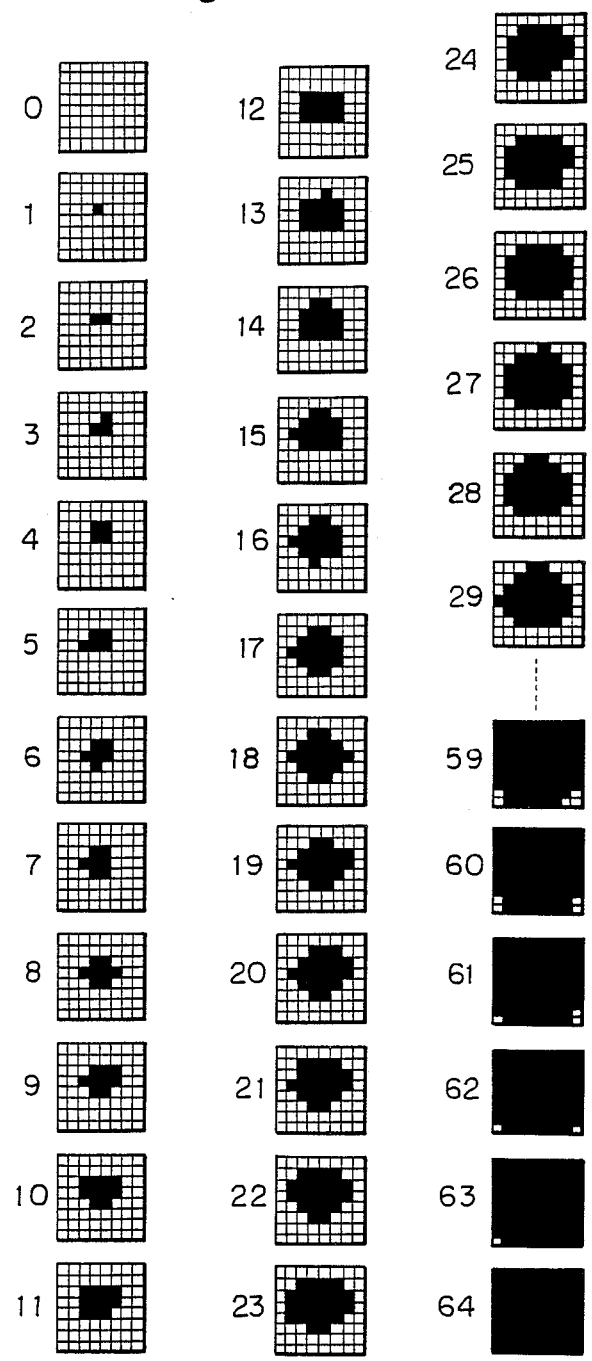
FIG. 23 shows one group of halftone representation patterns which are prepared by using original data which are different from those shown in FIGS. 10A to 10D.

Assume that the record density data shown in FIG. 20A are received, that sixty-four mother matrix patterns which correspond one to one to densities 1 to 64 are available as shown in FIG. 23, and that division into four is selected. In this case, the tone data are as shown below.

| | |
|---|---|
| $ICD_{1\,1} = 12$, $ICD_{2\,1} = 14$, | $ICD_{1\,1} = 16$, $ICD_{2\,1} = 18$, |
| $ICD_{1\,2} = 17$, $ICD_{2\,2} = 19$, | $ICD_{1\,2} = 21$, $ICD_{2\,2} = 20$ |
| $ICD_{1\,1} = 22$, $ICD_{2\,1} = 24$, | $ICD_{1\,1} = 21$ |
| $ICD_{1\,1} = 27$, $ICD_{2\,2} = 22$ | |

The reproduced image data are distributed as shown in FIG. 21A, in which the numerical values correspond to the densities of FIG. 23 while the alphabets are representative of the fragments of FIG. 18C. That is, child matrix patterns are arranged in correspondence with the distribution of incoming record density data (FIG. 20A) as follows.

| | |
|---|---|
| $CMP_{11}$ of 12, $CMP_{21}$ of 14 | $CMP_{11}$ of 16, $CMP_{21}$ of 18 |
| $CMP_{12}$ of 17, $CMP_{22}$ of 19 | $CMP_{12}$ of 20, $CMP_{22}$ of 22 |
| $CMP_{11}$ of 22, $CMP_{21}$ of 24 | $CMP_{11}$ of 21 |
| $CMP_{11}$ of 27, $CMP_{22}$ of 22 | |

Figure 22A:
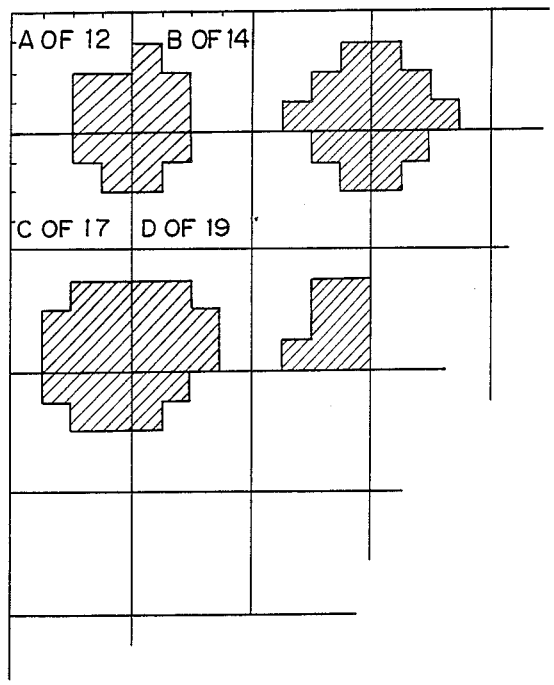
FIGS. 22A and 22B show record data distributions (hatched areas) which are derived from the halftone representation patterns of FIG. 23 and and in the manner shown in, respectively, FIGS. 21A and 21B.

Here, each leading number shows, among mother matrix patterns, a mother matrix pattern which is assigned to the density which is represented by that number. Each rectangular area as delimited by lines shows the size of a single mother matrix pattern. In FIG. 21A, each rectangular area as delimited by bold lines shows the size of a single mother matrix pattern. The reproduced image fragments are shown in FIG. 22A.

Figure 22B:
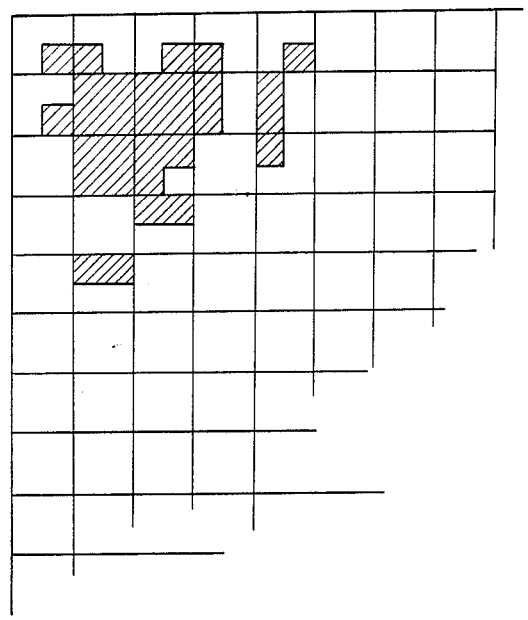

Assuming that tone data are arranged as shown in FIG. 20B, when image data are reproduced on a sixteen division basis (FIG. 18D), child matrix patterns are arranged as shown in FIG. 21B. In FIG. 21B, each rectangular area as defined by bold lines shows the size of a single mother matrix pattern. In FIG. 21, the numerals are representative of, among the mother matrix patterns 4, those mother matrix patterns which are assigned to the densities which are represented by those numerals. The reproduced image fragments are shown in FIG. 22B.

Figure 17A:
FIGS. 17A and 17B show mask patterns selectively usable for extracting child matrix patterns.

The child matrix mattern A of FIG. 18A and the child matrix patterns A and C of FIG. 18C are individually picked up by producing AND of a 1-byte mask pattern F0H shown in FIG. 17A and one line of data of an intended mother matrix in the main scanning direction. The AND is stored in a page memory or a buffer memory. Such is repeated on eight consecutive lines. The mask pattern of FIG. 17A is loaded with (logical) ONEs (indicated by hatching in the figure) in its part to be picked up, and with (logical) ZEROs in the other part. That is, the mask pattern shown in FIG. 17A is the data which is representative of F0H.

The child matrix pattern B of FIG. 18A and the child matrix patterns B and D of FIG. 18C are individually picked up by producing AND of a 1-byte mask pattern 0FH shown in FIG. 17A and one line of data of an intended mother matrix pattern in the main scanning direction. Then, OR of this AND and the AND previously stored in the memory is produced, the memory being updated with the OR. Such is repeated on eight consecutive lines. The mask pattern 0FH of FIG. 17A, too, is loaded with ONES (indicated by hatching in the figure) in a portion to be picked up, and with ZEROs in the other portion. The mask pattern 0FH of FIG. 17A is the data representative of 0FH.

Figure 17B:
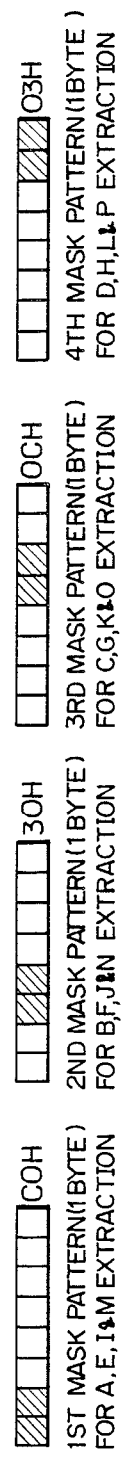

Likewise, in the extraction of pattern data as performed with the division of FIG. 18D, the extraction of child matrix patterns A, E and I are individually implemented with a mask pattern of FIG. 17B which is the data representative of C0H, that of B, F, J and N is implemented with a mask pattern of FIG. 17B which is the data representative of 30H, that of C, G, K and O are implemented with a mask pattern which is the data representative of 0CH, and that of D, H, L and P is implemented with a mask pattern which is 03H.

Data (ANDs) associated with A, E, I and M are directly written in the page memory or the buffer memory, but the data (ANDs) associated with B, F, J and N, C, G, K and O, and D, H, L and P each are written in the memory after being ANDed with the data previously written in the memory.

The principle of data extraction associated with the child matrix patterns stated above also applies to another child pattern division which is shown in FIG. 18E.

In the foregoing description, a mother matrix pattern is assumed to have one byte in the main scanning direction and provided in a byte basis and, in addition, all of the child matrix patterns are assumed to be of the same size. It is to be noted that for both of the mother and child matrix patterns the number of bits in the subscanning direction may be selected as desired because, from the data processing standpoint, whether it is on a byte basis or not is not an issue.

However, when it comes to the main scanning direction, that both of mother and child matrix patterns be provided on a byte basis is desirable because such would allow data to be processed rapidly on a byte basis. For this reason, in the above embodiment, even the child matrix patterns are regulated on a byte basis by using mask patterns and the previously stated logical processing. It follows that in accordance with such logical processing it is needless for all of the child matrix patterns, which constitute one mother matrix pattern, to be of the same size. So long as the mother matrix patterns are provided on a byte basis, the child matrix patterns can be processed easily on a byte basis, as described above.

Nevertheless, when both of the numbers of bits of mother and child patterns in the main scanning direction are fractions of a byte, the processing becomes complicated. In such a case, paying attention to the number of bits c of a child matrix pattern in the main scanning direction, assume $c \times e = e$ bytes where d and e are minimum integers. Then, one row of data of a child matrix pattern in the main scanning direction are written c consecutive times in e bytes, and then AND is produced by use of a mask pattern which leaves only required one row of data in the e bytes is produced and written in the page memory or the buffer memory. When the child matrix pattern is the leftmost one, such AND data are directly written in the memory. However, when the child matrix memory is not the leftmost one, the AND data are written in the memory after being ANDed with the data previously stored in the memory.

As described above, since use is made of mother matrix patterns each having a substantial size, the number of tones is increased. The mother matrix patterns are readily produced on a byte basis and, therefore, easy data processing is enhanced on a byte basis. Further, since child matrix patterns are assigned to tone data, considerable resolution is achieved.

Another advantage attainable with the above embodiment is that an image to be reproduced can be changed even in magnification. For example, while child matrix patterns are assigned one to one to tone data, in the divisions shown in FIGS. 18A to 18E, the size (number of bits, i.e., that of dots) differs from one child matrix pattern to another and, therefore, the magnification of an image to be reproduced differs from one division to another of FIGS. 18A to 18E. Specifically, assume that one tone data is representative of the density of a whole area which accommodates four dots of the original image (corresponding to one child matrix of FIG. 18D). Then, although the magnification of a reproduced image in the division of FIG. 18D to the original image is 1:1, the reproduced image resulting from the division of FIG. 18A is twice greater in the main scanning direction and four times greater in the subscanning direction than the original image, the reproduced image resulting from the division of FIG. 18B is four times greater in the main scanning direction and twice greater in the subscanning direction, the reproduced image resulting from the division of FIG. 18C is twice greater in each of the main and subscanning directions, and the reproduced image resulting from the division of FIG. 18E is one half in both of the main and subscanning directions.

It follows that if a plurality of child matrix pattern divisions are prepared as shown in FIGS. 18C to 18E, a particular magnification can be selected for an image to be reproduced by specifying a particular one of the division modes based on magnification command data M, which is representative of the number of divisions. To increase the number of magnifications, it is desirable to enlarge the mother matrix patterns.

The Y tone processing section 109y shown in FIG. 16 is constructed and operated as follows. The pattern memory 1012 is the ROM which stores sixty-four different mother matrix patterns as produced on the basis of the original patterns of FIGS. 1A, 9A and 11A. One of the mother matrix patterns is selected by record density data which is an output of the buffer memory 108y. Data in a particular part (horizontal entirety; eight bits) is designated by a microprocessor (CPU 1010) and, then, read out of the memory 108y to be fed to an AND gate LG$_1$. Also fed to the AND gate LG$_1$ is the previously mentioned mask pattern (one byte) which is output by the CPU 1010. The AND gate LG$_1$ produces data of a child matrix pattern which is applied to a data selector G$_3$. The data selector G$_3$ cooperates with an OR gate LG$_2$ to process the data extracted to provide a bit distribution which corresponds to a recording surface. By the data selector G$_3$, the OR gate LG$_2$ and the read control of the CPU 1010, the extracted data is developed in a buffer memory whose capacity is great enough to accommodate at least one row (eight-dot width) of data. The data developed in the buffer memory so is transferred to the laser driver 112y on a line basis.

Figures 1, 19A:
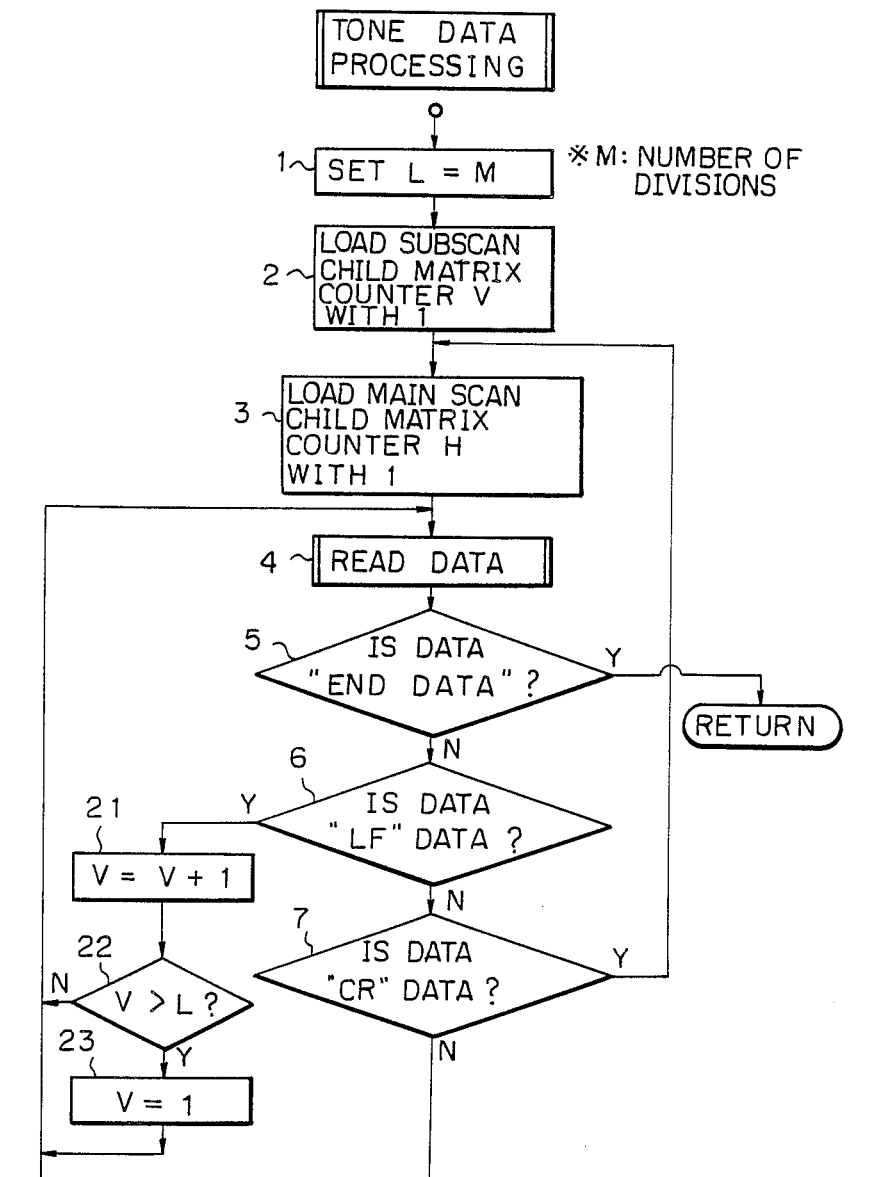
Figures 2, 19A:
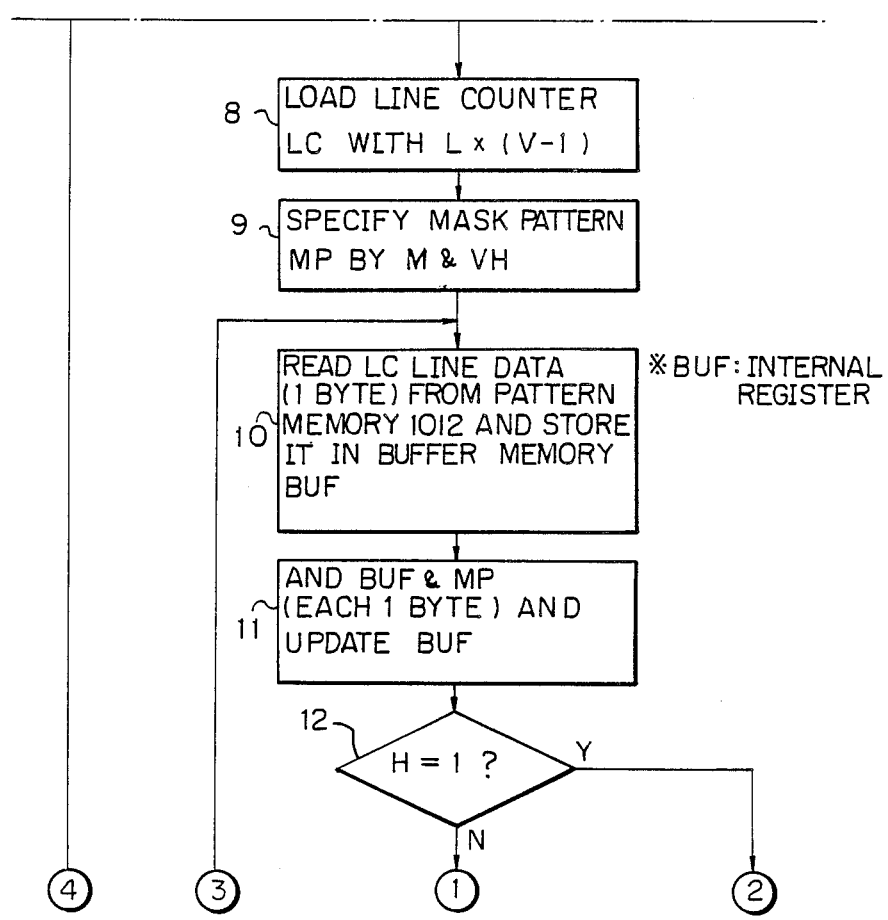
Figure 19B:
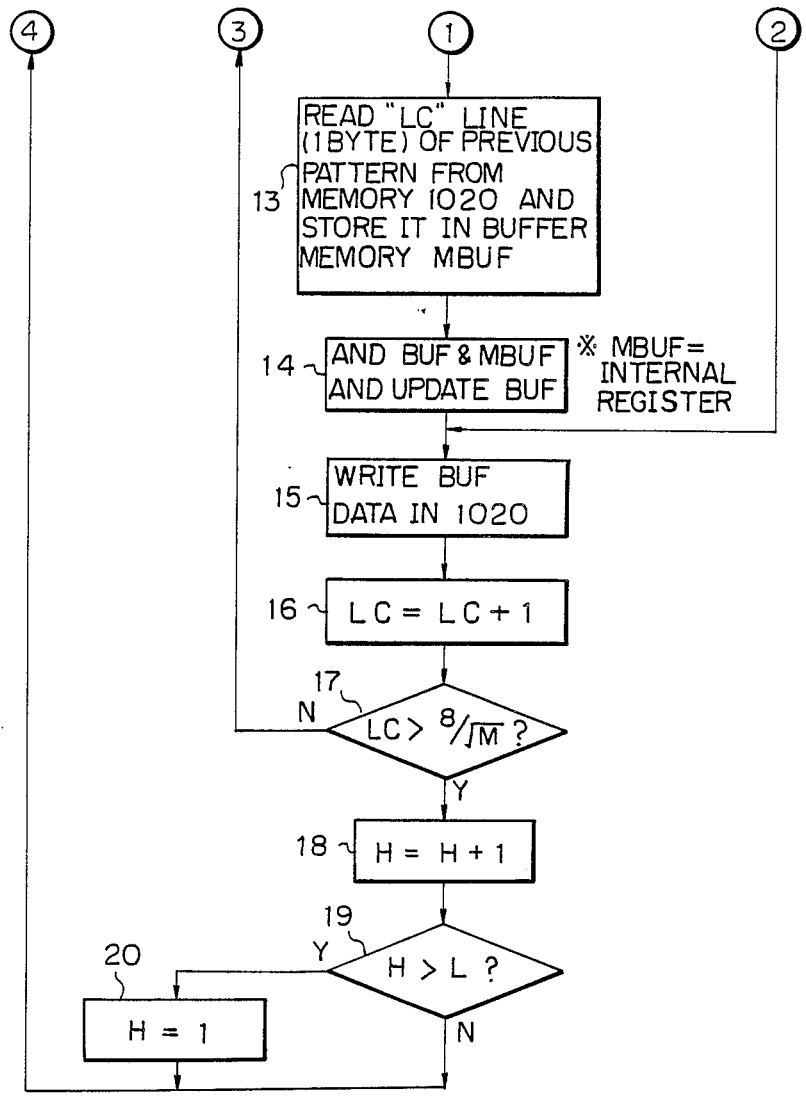

Referring to FIGS. 19A and 19B, the data processing operation of the CPU 1010 is demonstrated. As the CPU 1010 enters into tone data processing which is adapted to convert record density data fed from the memory 108y into record data (data representative of a distribution of record dots), it reads magnification command data M which is representative of the number of divisions of a mother matrix pattern, i.e., the number of child matrix patterns, and sets in a register L the numbers of divisions in the main and subscanning directions, i.e. $\sqrt{M}$ (STEP 1). In this example, M is one of 4 (FIG. 18C), 16 (FIG. 18D), and 64 (FIG. 18E); M which is 16 is the standard one which reproduces an image of the same size as the original image.

Subsequently, the CPU 1010 determines the position (j) of the child matrix to be processed with respect to the subscanning direction by loading a counter V with 1 (j=1) (STEP 2) and, then, determines the position (i) of the same with respect to the main scanning direction by loading a counter H with 1 (STEP 3). In this condition, CPU 1010 reads data output by the memory 108y. If the input data is record density data, the CPU 1010 loads a line counter LC with a value which is the product of the content of the register L and a value produced by substracting 1 from the content of the counter V (STEP 8).

Then, the CPU 1010 selects a mask pattern based on the magnification command data and the contents of the counters V and H (STEP 9). That is, the CPU 1010 selects a child matrix pattern $CMP_{ij}$ (i representing the content of the counter H, j that of the counter, and M the number of divisions, i.e. one of the division modes of FIGS. 18C to 18E), from which image data is to be picked up, based on the number of divisions M and the contents of the counters V and H and, thereafter, selects a mask patterns (e.g. FIGS. 17A or 17B) which is to be assigned to the child matrix pattern.

Thereafter, the CPU 1010 reads out of the pattern memory 1012 one byte of data on a particular line (main scanning direction) which is specified by the line counter LC and stores them in a buffer memory BUF (internal register) (STEP 10). The CPU 1010 applies the data stored in the buffer memory BUF and the mask pattern data to the AND gate $G_1$ and updates the buffer memory BUF with the resultant AND data (STEP 11), and it references the content of the counter (STEP 12).

If the content of the counter is 1, meaning that the intended child matrix pattern is the leftmost one in the mother matrix pattern, the CPU 1010 writes the data stored in the BUF directly in the buffer memory 1020 (STEP 15). If it is not 1, meaning that data of the leftmost child matrix pattern has already been written in the memory 1020 with mask pattern data of ZEROs lodged in the other child matrix pattern writing portion, the CPU 101 reads the "LC" line (LC being the content of the counter LC) of the previously stored pattern data and, then, stores it in a buffer memory MBUF (internal register) (STEP 13). Then, the CPU 1010 applies the data stored in the buffer memory MBUF and the data stored in the BUF to the OR gate $LG_2$ to provide their OR, the buffer memory BUF being updated with that OR data (STEP 14). Thereupon, the CPU 1010 updates the page memory 1020 with the data of the buffer memory BUF (STEP 15).

Next, the CPU 1010 increments the line counter LC by one (STEP 16), and then compares the content of the line counter LC with the quotient of 8 (number of lines of the child matrix pattern)/$\sqrt{M}$ (STEP 17). If the content of the line counter LC is not greater than 8/$\sqrt{M}$, the program advances to image extraction from the next line; if the former is greater than the latter, the CPU 1010 increments the counter H by one (STEP 18) and, then, compares it with the content of the register 1 (STEP 29). If the former is greater than the latter, meaning that image extraction from the leftmost child matrix in the mother matrix pattern has been completed, the CPU 1010 increments the counter H by one (STEP 20) and advances to the next data reading (STEP 4) in order to process the data of the leftmost matrix pattern.

If the data read in STEP 4 shows that halftone processing has been completed, the CPU 1010 returns to the main routine. If the data is representative of line feed "LF", the CPU 1010 increments the counter V by one (STEP 21) and compares the new count of the counter V with the content of the register L (STEP 22). If the former is greater than the latter, meaning that one mother matrix pattern has been fully subjected to image processing, the CPU 1010 sets 1 in the counter V (STEP 23) and returns to data reading (STEP 4). Further, if the data is representative of carriage return "CR", meaning that image processing over the width of one mother matrix pattern has been completed, the CPU 1010 sets 1 in the counter H (STEP 3) and advances to data reading (STEP 4).

In the embodiment shown and described, an original pattern having threshold data (FIGS. 1A, 9A or 11A) is used to prepare a group of sixty-four mother matrix patterns (halftone representation patterns), and they are stored in the memory 1012 beforehand. Alternatively, the original pattern may be stored in the memory 1012 as a halftone representation pattern so as to compare record density data output by the memory 108y with the thresholds of the original pattern to thereby prepare mother matrix patterns. Another possible approach is, before tone processing, comparing an original pattern and each of record density tone data (representative of 1 to 64) to prepare a group of sixty-four mother matrix patterns and store them in a RAM or like memory. Such reduces data which should be stored in the memory 1012.

Using the same hardware and control as those of the tone processing section 109y, the other tone processing sections 109m, 109c and 109bk generate record image data of magenta, cyan and black, respectively. In these sections 109, 109c and 109bk, the mother matrices (halftone representation patterns) stored in their memories have the centers of spots which are different in position from each other based on the original patterns of FIGS. 1A to 1C, 9A to 9D, 10A, and 11A to 11C.

As described above, in color-by-color halftone processing, the present invention uses halftone representation patterns which differ in the position of the centers of spots on a color basis, and assigns each predetermined part of a selected one of those patterns to a respective one of record density data. This enhances color reproducibility of highlight portions and, especially, improves clearness of colors when a number of colors are recorded each in relatively low density.

Also, in accordance with the present invention, the halftone representation patterns adapted to record a first and a second color which degrades color reproducibility when mixed together, e.g., magenta and cyan are provided with spots which are different in position from each other. Such enhances color reproducibility of highlight portions and, especially, improves clearness of colors when a number of colors are recorded each in relatively low density.

Further, in accordance with the present invention, in addition to the fact that the halftone representation patterns adapted to record a first and a second color which degrades color reproducibility when mixed together, e.g., magenta and cyan are provided spots which are different in position from each other, halftone representation patterns adapted for a third color such as yellow are provided with spots which intervene between those of the first and second colors. Hence, those portions which are recorded in low density appear pure to enhance color reproducibility of highlight portions and, especially, distinctness of colors is improved when a number of colors are recorded each in relatively low density. Since the third color is scattered in a number of spots, the freedom of configuring the halftone representation patterns for the first and second colors such that they do not overlap even at relatively high density is extraordinary. This ensures quality color printing even if the printer accuracy is insufficient. Since black produced by substractive mixture is rendered by the superposition of all of the first to third colors, spots of a pattern for an ink plate may be superposed on those of all of the first to third colors to achieve effective representation of colors and, thereby, to realize high quality multi-tone color image recording.

Various modifications will become possible for those skilled in the art after receiving the teachings of the present disclosure without departing from the scope thereof.

What is claimed is:

1. A digital processing method for reproduction of a color image comprising the steps of:
    separating a color image into a plurality of color components;
    converting image density into digital data on a color component basis;
    processing said digital data to produce color component record density data;
    specifying on a color basis and based on said color component record density data, one of a plurality of halftone representation patterns, each of which has a predetermined number of data bits and further wherein record data bits and non-record data bits, form said predetermined number of data bits wherein each of said bits correspond to a respective recording density, which are representative of the entire image;
    setting up on a color basis a correspondence between data bits of one of said specified halftone representation patterns that represent a predetermined small area of a recording medium, said small area being divided into a plurality of minute subareas;
    recording for a predetermined color in each minute subarea of said small area to which, among the data bits which correspond to the small area a given record data bit is assigned which represents said color;
    assigning a group of plurality of halftone representation patterns to each of the color components, with each of said halftone representation patterns in the same group having a distribution of record data bit which is such that, when said halftone representation pattern is provided in a two-dimensional, or X-Y, bit distribution, record data bits sequentially expand from a predetermined point of X-Y coordinates as record density increases with said predetermined point of X-Y coordinates differing from one group to another;
    specifying one of the halftone representation patterns, which correspond to any of the color components based on color component record density data of said color component, at least a part of said halftone representation pattern specified being extracted; and
    assigning said color component, being recorded by said extracted part of said halftone representation pattern to a predetermined small area of a recording medium which is assigned to said color component record density data;
    wherein assuming that each of the halftone representation patterns MMP is divided into m parts in a main scanning direction and n parts in a subscanning direction, i.e., into m×n submatrix pattern where $CMP_{11}$ to $CMP_{mn}$ are formed, where the former half of each subscript is representative of a position of the submatrix pattern in the halftone representation pattern MMP in the main scanning direction and the latter half of each subscript is representative of a position of said submatrix pattern in the subscanning direction, that said halftone representation pattern may be expressed as:

$$MMP = \sum_{j=1}^{n} \sum_{i=1}^{m} CMP_{ji}$$

and that one halftone representation pattern of image data is defined by m×n record density data such that $$\sum_{j=1}^{n} \sum_{i=1}^{m} ICD_{ji}$$

which is made up of the components $ICD_{11}$ to $ICD_{mn}$ in the summation, with data in the submatrix pattern $CMP_{ij}$ of the halftone representation pattern which is specified by the record density data $ICD_{ij}$ being produced as record data in a bit distribution corresponding to said record density data $ICD_{ij}$.

2. A digital color image reproducing apparatus, comprising:
    color image reading means for separating a color image into a plurality of color components and then converting image density into digital data on a color components basis;
    color component digital data processing means for processing said digital data into color components record density data;
    memory means for storing a plurality of groups of data which represent a plurality of halftone representation pattern data in each of which has record data bits and non-record bits which are distributed in correspondence with a respective one of record densities, which are to be representative of a given area, wherein each of said groups are assigned to a respective one of the color components, with each of the halftone representation pattern data in the same group, when distributed in a two-dimensional, or X-Y, bit distribution define a record area such that the record data bits sequentially expand from a predetermined point with respect to the X-Y coordinates with the record density increasing, and with said predetermined point of X-Y coordinates differing from one group to another;
    pattern data reading means, for specifying one of the groups on a color components basis, wherein the specified one of said halftone representation pattern data, of said one group is based on the corresponding color component record density data, and reading data of a predetermined part of said one halftone representation pattern data specified out of said memory means; and
    recording means for assigning said data in said predetermined part to a predetermined small area of a recording medium said small area being divided into a plurality of minute subareas, and recording a predetermined color in each minute subarea of said predetermined area to which record information bits in said data are to be assigned;

wherein assuming that each of the halftone representation patterns MMP is divided into m parts in a main scanning direction and n parts in a subscanning direction, i.e., into m×n submatrix pattern where $CMP_{11}$ to $CMP_{mn}$ are formed, where the former half of each subscript is representative of a position of the submatrix pattern in the halftone representation pattern MMP in the main scanning direction and the latter half of each subscript is representative of a position of said submatrix pattern in the subscanning direction, such that said halftone representation pattern may be expressed as:

$$MMP = \sum_{j-1}^{n} \sum_{i-1}^{m} CMP_{ji}$$

and that one halftone representation pattern of image data is defined by m×n record density data such that $$\sum_{j-1}^{n} \sum_{i-1}^{m} ICD_{ji}$$

which is made up of the components $ICD_{11}$ to $ICD_{mn}$, in the summation, where the pattern data of the submatrix pattern $CMP_{ij}$ of the halftone representation pattern is specified by the record density data $ICD_{ij}$ being produced as record data in a bit distribution corresponding to said record density data $ICD_{ij}$.

3. A digital processing method for reproducing a color image, comprising the steps of:

separating a color image into a plurality of color components;

converting image density into digital data on a color component basis to convert said digital data into color component record density data;

converting said color component record density data into record and non-record data bits by using a halftone representation pattern having a predetermined small area, said small area being divided into a plurality of minute subareas, in which a plurality of threshold data are provided in one-to-one correspondence with predetermined minute subareas, or halftone representation patterns constituted by a plurality of data bit distribution patterns, a number of which corresponds to a predetermined range of record density data, in which record and non-record bits are distributed in correspondence with said small area by comparing all of threshold data with said record density data; and assigning record and non-record bit data to a minute area of a recording medium on a color component basis, and recording a predetermined color in a minute area to which, among the bit data assigned to said first-mentioned minute subarea, the record data bits are to be assigned;

a plurality of groups of the halftone representation patterns are provided one for a respective one of the color components, each of said halftone representation patterns adapted for at least first color and second color recording having a record data bit distribution which is such that, when said halftone representation patterns is used for recording a predetermined area, record information bits sequentially expand from a predetermined point of X-Y coordinates, a plurality of said predetermined points of X-Y coordinates being scattered in particular positions which differ from one color components to another;

wherein assuming that each of the halftone representation patterns MMP is divided into m parts in a main scanning direction and n parts in a subscanning direction, i.e., into m×n submatrix pattern where $CMP_{11}$ to $CMP_{mn}$ are formed, where the former half of each subscript is representative of a position of the submatrix pattern in the halftone representation pattern MMP in the main scanning direction and the latter half of each subscript is representative of a position of said submatrix pattern in the subscanning direction, that said halftone representation pattern may be expressed as:

$$MMP = \sum_{j-1}^{n} \sum_{i-1}^{m} CMP_{ji}$$

and that one halftone representation pattern of image data is defined by m×n record density data such that $$\sum_{j-1}^{n} \sum_{i-1}^{m} ICD_{ij}$$

which is made up of the components $ICD_{11}$ to $ICD_{mn}$ in the summation, with the pattern data of the submatrix pattern $CMP_{ij}$ of the halftone representation pattern being specified, by the record density data $ICD_{ij}$, which is produced as record data in a bit distribution corresponding to said record density data $ICD_{ij}$.

4. A method as claimed in claim 3 wherein minute subareas a number of which corresponds to a part of the halftone representation pattern are recorded assigned one to each color record density data.

5. A method as claimed in claim 3, wherein while the halftone representation patterns adapted for the first color and second color recording become substantially analogous in pattern when many of each said halftone representation pattern are developed in a plane, threshold data or record and non-record data are distributed such that the predetermined points associated with the first recording and those associated with the second recording are distributed at the furthest point from each other and the distance between these if plotted on an X-Y coordinate system are at the maximum distance from each other.

6. A digital color image reproducing apparatus, comprising:

color image reading means for separating a color image into a plurality of color components and, then, converting image density into digital data on a color component basis;

color component data processing means for processing said digital data into color components record density data;

memory means storing a plurality of groups of a plurality of halftone representation pattern data in each of which print data bit and non-print data bit are distributed in correspondence with a respective one of record densities, which are to be rendered as a certain entire area, each of said groups being assigned to a respective one of the color components, each of the halftone representation pattern data in the same group, when distributed in a two-dimensional, or X-Y, bit distribution which defines a record area, being such that the record data bits sequentially expand from a predetermined point of X-Y coordinates as the record density is increased, a plurality of said predetermined points being distributed in positions which differ from group to group;

pattern data reading means for specifying one of the groups on a color components basis, specifying one halftone representation pattern data of said one group based on the color component record density data, and reading data of a predetermined area of said one halftone representation pattern data specified out of said memory means; and recording means for assigning said data in said predetermined area to a predetermined small area of a recording medium, and recording a predetermined color in a minute subarea of said predetermined area to which record data bits in said data are to be assigned;

wherein assuming that each of the halftone representation patterns MMP is divided into m parts in a main scanning direction and n parts in a subscanning direction, i.e., into m×n submatrix pattern where $CMP_{11}$ to $CMP_{mn}$ are formed, where the former half of each subscript is representative of a position of the submatrix pattern in the halftone representation pattern MMP in the main scanning direction and the latter half of each subscript is representative of a position of said submatrix pattern in the subscanning direction, that said halftone representation pattern may be expressed as:

$$MMP = \sum_{j=1}^{n} \sum_{i=1}^{m} CMP_{ji}$$

and that one halftone representation pattern of image data is provided by m×n record density data $$\sum_{j=1}^{n} \sum_{i=1}^{m} ICD_{ij}$$

which is made up of the components $ICD_{11}$ to $ICD_{mn}$, in the summation, with the pattern data in the submatrix pattern $CMP_{ij}$ of the halftone representation pattern which is specified by the record density data $ICD_{ij}$ being produced as record data in a bit distribution corresponding to said record density data $ICD_{ij}$.

7. In a digital processing method for reproducing a color image, having the steps of separating a color image into a plurality of color component, and converting image density into digital data on a color component basis to convert said digital data into color component record density data; converting said color component record density data into record an non-record bit data by using a halftone representation pattern having a predetermined small area in which a plurality of threshold data are provided in one-to-one correspondence with predetermined minute subareas, or halftone representation patterns constituted by a plurality of bit distribution patterns, a number of which corresponds to a predetermined range of record density data, in which record and non-record bits are distributed in correspondence to said small area by comparing all of threshold data with said record density data; and assigning record and non-record bit data to a minute area of recording medium on a color component basis, and recording a predetermined color in a minute area to which, among the bit data assigned to said first-mentioned minute subarea, the record data bits are to be assigned;

each of the halftone representation patterns adapted for first color and second color recording is such that, when said halftone representation pattern is used for recording a predetermined area, record information bits sequentially expand from a predetermined point of X-Y coordinates, said predetermined point of X-Y coordinates differing in position from one color to another, a halftone representation pattern for third color recording being different from those of the first color and second color recording in that record data bits expand from each of a plurality of predetermined points which are distributed between the predetermined points of the first color and second color recording;

wherein assuming that each of the halftone representation patterns MMP is divided into m parts in a main scanning direction and n parts in a subscanning direction, i.e., into m×n submatrix pattern where $CMP_{11}$ to $CMP_{mn}$ are formed, where the former half of each subscript is representative of a position of the submatrix pattern in the halftone representation pattern MMP in the main scanning direction and the latter half of each subscript is representative of a position of said submatrix pattern in the subscanning direction, such that said halftone representation pattern may be expressed as:

$$MMP = \sum_{j=1}^{n} \sum_{i=1}^{m} CMP_{ji}$$

and that one halftone representation pattern of image information is defined by m×n record density data such that $$\sum_{j=1}^{n} \sum_{i=1}^{m} ICD_{ij}$$

which is made up of the components $ICD_{11}$ to $ICD_{mn}$, in the summation, the pattern data of the submatrix pattern $CMP_{ij}$ of the halftone representation pattern is specified by the record density data $ICD_{ij}$ being produced as record data in a bit distribution corresponding to said record density data $ICD_{ij}$.

8. A method as claimed in claim 7, wherein minute subareas a number of which corresponds to a part of the halftone representation pattern are recorded assigned one to each color record density data.

9. A method as claimed in claim 7, wherein while the halftone representation patterns adapted for the first color and second color recording become substantially analogous in pattern when many of each said halftone representation pattern are developed in a plane, threshold data or record and non-record data are distributed such that the predetermined points associated with the first recording and those associated with the second recording are distributed at a maximum distance if plotted on an X-Y system, from each other.

10. A digital color reproducing apparatus comprising:

color image reading means for separating a color image into a plurality of color components and, then, converting image density into digital data on a color component basis;